(12) United States Patent
Tsuchiya et al.

(10) Patent No.: US 8,698,982 B2
(45) Date of Patent: Apr. 15, 2014

(54) METHOD OF MANUFACTURING LIQUID CRYSTAL DEVICE AND LIQUID CRYSTAL DEVICE HAVING A POLARIZATION SEPARATING ELEMENT OUTSIDE A DISPLAY AREA

(75) Inventors: Yutaka Tsuchiya, Hara-mura (JP); Takumi Seki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 12/546,417

(22) Filed: Aug. 24, 2009

(65) Prior Publication Data

US 2010/0085514 A1    Apr. 8, 2010

(30) Foreign Application Priority Data

Oct. 8, 2008    (JP) .................... 2008-261377

(51) Int. Cl.
  *G02F 1/1335* (2006.01)
  *G02F 1/13* (2006.01)

(52) U.S. Cl.
  USPC ............... 349/96; 349/99; 349/102; 349/194; 349/196; 349/201

(58) Field of Classification Search
  USPC ............... 349/96, 98, 99, 102, 194, 196, 197, 349/199, 201, 202; 356/365–368
  See application file for complete search history.

(56) References Cited

U.S. PATENT DOCUMENTS

| | | | |
|---|---|---|---|
| 5,541,745 A | * | 7/1996 | Fergason .................. 349/194 |
| 6,665,070 B1 | * | 12/2003 | Yarussi et al. ............. 356/369 |
| 6,989,877 B2 | | 1/2006 | Iijima |
| 7,362,446 B2 | * | 4/2008 | Van Der Pasch et al. ..... 356/499 |
| 2007/0199645 A1 | * | 8/2007 | Yanai et al. .............. 156/99 |

FOREIGN PATENT DOCUMENTS

| | | | | |
|---|---|---|---|---|
| JP | 08-201801 | | 8/1996 | |
| JP | 2000-221461 | | 8/2000 | |
| JP | 2000221461 A | * | 8/2000 | ........... G02F 1/13 |
| JP | 2003-043475 | | 2/2003 | |
| JP | 2003-107452 | | 4/2003 | |

* cited by examiner

*Primary Examiner* — Lucy Chien
*Assistant Examiner* — Paisley L Arendt
(74) *Attorney, Agent, or Firm* — Lowe Hauptman & Ham, LLP

(57) ABSTRACT

A liquid crystal device includes a first substrate and a second substrate that are arranged so as to face each other, a liquid crystal layer that is pinched between the first substrate and the second substrate, one pair of polarizers that are arranged on both outer sides of the first substrate and the second substrate, a first optical element having a polarization separation function that is disposed in at least one spot of the first substrate, and a display area that contributes to display. The first optical element is arranged outside the display area.

13 Claims, 17 Drawing Sheets

METHOD OF MANUFACTURING LIQUID CRYSTAL DEVICE AND LIQUID CRYSTAL DEVICE HAVING A POLARIZATION SEPARATING ELEMENT OUTSIDE A DISPLAY AREA

BACKGROUND

1. Technical Field

The present invention relates to a method of manufacturing a liquid crystal device and a liquid crystal device.

2. Related Art

Liquid crystal devices include a liquid crystal cell that is acquired by pinching a liquid crystal layer between one pair of substrates that are arranged so as to oppose each other and one pair of polarizing plates that are arranged on both outer sides of the liquid crystal cell. The liquid crystal devices perform a display by using polarized light. Thus, the liquid crystal devices are set such that a predetermined positional relationship is formed between the aligning direction of liquid crystal molecules of the liquid crystal layer and the optical axis of the pair of polarizing plates. Accordingly, when there is any deviation in the predetermined arranging positions of the liquid crystal cell and the polarizing plate in a process for attaching the polarizing plates to the liquid crystal cell, the desired optical characteristic (the contrast and the like) cannot be acquired, and whereby the display quality deteriorates.

Thus, a method in which a positional adjustment of the outer shape of the polarizing plate is performed by using an alignment mark that is disposed on one substrate of the liquid crystal cell as a reference has been proposed (for example, see JP-A-2000-221461). In addition, a method in which a positional adjustment between the aligning direction of the liquid crystal cell and the optical axis of the polarizing plate is performed by using the optical axis of a master polarizer as a reference has been proposed (for example, see JP-A-8-201801 and JP-A-2003-107452).

However, according to the above-described method disclosed in JP-A-2000-221461, the positional adjustment is performed based on the alignment mark and the outer shape of the polarizing plate. Thus, when there is a deviation between the outer shape of the polarizing plate and the optical axis, it is difficult to accurately adjust the position of the optical axis of the polarizing plate in respect to the liquid crystal cell. In addition, according to the methods disclosed in JP-A-8-201801 and JP-A-2003-107452, the aligning direction of the liquid crystal cell or the optical axis of each polarizing plate is individually adjusted into position so as to be attached by using the optical axis of the master polarizer as a reference. Accordingly, the number of processes for the positional adjustment and the attachment increases. In addition, when there is a deviation in the position of the master polarizer, the deviation is reflected on the positional adjustment of the liquid crystal cell and the polarizing plate.

SUMMARY

An advantage of some aspects of the invention is that it provides a method for manufacturing a liquid crystal device and a liquid crystal device. The invention can be implemented in the following forms or the following applied examples.

APPLIED EXAMPLE 1

According to a first aspect of the invention, there is provided a liquid crystal device including: a first substrate and a second substrate that are arranged so as to face each other; a liquid crystal layer that is pinched between the first substrate and the second substrate; one pair of polarizers that are arranged on both outer sides of the first substrate and the second substrate; a first optical element having a polarization separation function that is disposed in at least one spot of the first substrate; and a display area that contributes to display. The first optical element is arranged outside of the display area.

According to the configuration of Applied Example 1, the liquid crystal device includes the first optical element that is used as the reference for the positional adjustment of the polarizer at the time when the polarizer is to be attached. Accordingly, the optical axis of the polarizer can be optically adjusted to a predetermined position by using the optical axis of the first optical element as the reference, and whereby any relative positional deviation between the liquid crystal cell and the polarizer can be decreased. Therefore, any decrease in the contrast of the liquid crystal device is suppressed, and whereby the display quality of the liquid crystal device can be improved.

APPLIED EXAMPLE 2

In the above-described liquid crystal device, the optical axis of the first optical element is arranged so as to be parallel to the aligning direction of the liquid crystal layer on the first substrate, and the optical axis of at least one polarizer included in the pair of polarizers is arranged so as to be parallel to the optical axis of the first optical element.

According to the configuration of Applied Example 2, when the polarizer is attached to the liquid crystal cell, the intensity of the light transmitted through the area of the liquid crystal cell, in which the first optical element is disposed, and the polarizer reaches its maximum in the case where the optical axis of the polarizer is located in a predetermined position with respect to the optical axis of the first optical element. Accordingly, when the intensity of the light is measured, a measurement device having high sensitivity on a high light-intensity side can be used appropriately.

APPLIED EXAMPLE 3

In the above-described liquid crystal device, the optical axis of the first optical element is arranged so as to be perpendicular to the aligning direction of the liquid crystal layer on the first substrate, and the optical axis of at least one polarizer included in the pair of polarizers is arranged so as to be perpendicular to the optical axis of the first optical element.

According to the configuration of Applied Example 3, when the polarizer is attached to the liquid crystal cell, the intensity of the light transmitted through the area of the liquid crystal cell, in which the first optical element is disposed, and the polarizer reaches its minimum in the case where the optical axis of the polarizer is located in a predetermined position with respect to the optical axis of the first optical element. Accordingly, when the intensity of the light is measured, a measurement device having high sensitivity on a low light-intensity side can be used appropriately.

APPLIED EXAMPLE 4

In the above-described liquid crystal device, the first optical element is disposed in two or more spots.

According to the configuration of Applied Example 4, the first optical element is disposed in two or more spots. Accordingly, the optical axis of the first polarizer can be optically adjusted to a predetermined position by using the optical axis of the first optical element as a reference in two or more positions that are different from one another. Therefore, the position of the first polarizer relative to the liquid crystal cell can be adjusted more accurately.

APPLIED EXAMPLE 5

In the above-described liquid crystal device, the first optical element disposed in the two or more spots includes: an optical element that is disposed in a first spot and has an optical axis that is arranged so as to be parallel to the aligning direction of the liquid crystal layer on the first substrate; and an optical element that is disposed in a second spot that is different from the first spot and has an optical axis that is arranged so as to be perpendicular to the aligning direction of the liquid crystal layer on the first substrate.

According to the configuration of Applied Example 5, as the intensity of light transmitted through the optical element, of which the optical axis is arranged so as to be parallel to the aligning direction of the liquid crystal layer, and the polarizer is increased, the intensity of light transmitted through the optical element, of which the optical axis is arranged so as to be perpendicular to the aligning direction of the liquid crystal layer, and the polarizer is decreased. Thus, when the positional relationship is determined such that the difference between the measured values of the intensities of light reaches its maximum, the position of the polarizer relative to the liquid crystal cell can be adjusted more accurately.

APPLIED EXAMPLE 6

In the above-described liquid crystal device, the first optical element is arranged in a position so as to not overlap with the liquid crystal layer in the plan view.

According to the configuration of Applied Example 6, the liquid crystal layer is not interposed between the first optical element and the polarizer. Thus, when the optical axis of the polarizer is optically adjusted to a predetermined position by using the optical axis of the first optical element as a reference, the optical influence of the liquid crystal layer is excluded. Accordingly, the position of the polarizer relative to the liquid crystal cell can be adjusted more accurately.

APPLIED EXAMPLE 7

In the above-described liquid crystal device, the first substrate has a protruding portion that does not overlap with the second substrate in the plan view, and the first optical element is disposed in the protruding portion.

According to the configuration of Applied Example 7, the first optical element does not overlap with the liquid crystal layer and the second substrate in the plan view. Accordingly, the liquid crystal layer and the second substrate are not interposed between the first optical element and the polarizer. Thus, when the optical axis of the polarizer is optically adjusted to a predetermined position by using the optical axis of the first optical element as the reference, the optical influence of the liquid crystal layer and the second substrate is excluded. Accordingly, the position of the polarizer relative to the first optical element can be adjusted more accurately.

APPLIED EXAMPLE 8

In the above-described liquid crystal device, the first optical element includes a metal reflection film arranged in a stripe shape.

According to the configuration of Applied Example 8, a wire grid polarizer can be used as the first optical element.

APPLIED EXAMPLE 9

In the above-described liquid crystal device, the first optical element includes a prism array and a dielectric interference film that is formed on the prism array.

According to the configuration of Applied Example 9, an optical element including a dielectric interference film that is formed on the prism array can be used as the first optical element.

APPLIED EXAMPLE 10

The above-described liquid crystal device further includes: a reflective display area that is arranged in the display area; and a second optical element that is disposed in the reflective display area of the first substrate and has a polarization separation function.

According to the configuration of Applied Example 10, when the first optical element that is used as the reference for the positional adjustment of the polarizer and the second optical element that is disposed in the reflective display area are configured so as to have a same configuration, the first optical element can be formed in the same process as used for forming the second optical element.

APPLIED EXAMPLE 11

In the above-described liquid crystal device, at least one polarizer that is included in the pair of polarizers includes a polarizing plate and an optical compensation plate that is laminated on the polarizing plate.

According to the configuration of Applied Example 11, even when the polarizer includes the polarizing plate and the optical compensation plate, any relative positional deviation among the liquid crystal cell, the first polarizer, and the second polarizer can be decreased.

APPLIED EXAMPLE 12

According to a second aspect of the invention, there is provided a method of manufacturing a liquid crystal device. The method includes: preparing a liquid crystal cell that includes a first substrate and a second substrate that are arranged so as to face each other, a liquid crystal layer that is pinched between the first substrate and the second substrate, and a first optical element having a polarization separation function that is disposed in at least one spot of the first substrate; measuring the intensity of light transmitted through an area of the liquid crystal cell, in which the first optical element is disposed, and the first polarizer by rotating at least one between the liquid crystal cell and the first polarizer within an opposing face in a state in which the first polarizer is arranged on an outer side of one substrate between the first substrate and the second substrate of the liquid crystal cell, so as to oppose the one substrate; and determining the relative positional relationship of the based on the result of measurement of the intensity of the light and attaching the first polarizer to one substrate of the liquid crystal cell.

According to the configuration of Applied Example 12, the optical axis of the first polarizer is optically adjusted to a predetermined position by using the optical axis of the first optical element as the reference, and whereby the relative positional relationship of the first polarizer with the liquid crystal cell is determined. Accordingly, any relative positional deviation between the liquid crystal cell and the first polarizer can be decreased. Therefore, the deterioration of the optical characteristic such as the contrast of the liquid crystal device is suppressed, and whereby the display quality of the liquid crystal device can be improved. In addition, the positional relationship between one polarizer and the liquid crystal cell is determined and the polarizer is attached to the liquid crystal cell in the same process. Accordingly, an increase in the number of processes for the positional adjustment and the attachment can be suppressed.

APPLIED EXAMPLE 13

In the above-described method of manufacturing the liquid crystal device, the first polarizer is arranged on the outer side of the first substrate of the liquid crystal cell so as to face the first substrate in the measuring of the intensity of the light.

According to the configuration of Applied Example 13, the first polarizer is arranged on the outer side of the first substrate on which the first optical element is disposed, and accordingly, the liquid crystal layer is not interposed between the first optical element and the first polarizer. Thus, when the optical axis of the first polarizer is optically adjusted to a predetermined position by using the optical axis of the first optical element as the reference, the optical influence of the liquid crystal layer is excluded. Accordingly, the position of the first polarizer relative to the liquid crystal cell can be adjusted more accurately.

APPLIED EXAMPLE 14

In the above-described method of manufacturing the liquid crystal device, the optical axis of the first optical element is arranged so as to be parallel to the aligning direction of the liquid crystal layer on the first substrate. In the determining of the relative positional relationship, the relative positional relationship of the first polarizer with the first optical element is determined such that the intensity of the light reaches its maximum.

According to the configuration according to Applied Example 14, when the intensity of light transmitted through the area of the liquid crystal cell, in which the first optical element is disposed, and the first polarizer is measured, a measurement device having high sensitivity on a high light-intensity side can be used appropriately.

APPLIED EXAMPLE 15

In the above-described method of manufacturing the liquid crystal device, the optical axis of the first optical element is arranged so as to be perpendicular to the aligning direction of the liquid crystal layer on the first substrate. In the determining of the relative positional relationship, the relative positional relationship of the first polarizer with the first optical element is determined such that the intensity of the light reaches its minimum.

According to the configuration according to Applied Example 15, when the intensity of light transmitted through the area of the liquid crystal cell, in which the first optical element is disposed, and the first polarizer is measured, a measurement device having high sensitivity on a low light-intensity side can be used appropriately.

APPLIED EXAMPLE 16

In the above-described method of manufacturing the liquid crystal device, the first optical element includes a metal reflection film arranged in a stripe shape.

According to the configuration of Applied Example 16, a wire grid polarizer can be used as the first optical element.

APPLIED EXAMPLE 17

In the above-described method of manufacturing the liquid crystal device, the first optical element includes a prism array and a dielectric interference film that is formed on the prism array.

According to the configuration of Applied Example 17, an optical element including a dielectric interference film that is formed on the prism array can be used as the first optical element.

APPLIED EXAMPLE 18

In the above-described method of manufacturing the liquid crystal device, the first optical element is disposed in two or more spots.

According to the configuration of Applied Example 18, the first optical element is disposed in two or more spots. Accordingly, the optical axis of the first polarizer can be optically adjusted to a predetermined position by using the optical axis of the first optical element as a reference in two or more positions that are different from one another. Therefore, the position of the first polarizer relative to the liquid crystal cell can be adjusted more accurately.

APPLIED EXAMPLE 19

In the above-described method of manufacturing the liquid crystal device, the first optical element disposed in the two or more spots includes: an optical element that is disposed in a first spot and has an optical axis that is arranged so as to be parallel to the aligning direction of the liquid crystal layer on the first substrate; and an optical element that is disposed in a second spot that is different from the first spot and has an optical axis that is arranged so as to be perpendicular to the aligning direction of the liquid crystal layer on the first substrate.

According to the configuration of Applied Example 19, as the intensity of light transmitted through the optical element, of which the optical axis is arranged so as to be parallel to the aligning direction of the liquid crystal layer, and the first polarizer is increased, the intensity of light transmitted through the optical element, of which the optical axis is arranged so as to be perpendicular to the aligning direction of the liquid crystal layer, and the first polarizer is decreased. Thus, when the positional relationship is determined such that the difference between measured values of the intensities of light reaches its maximum, the position of the first polarizer relative to the liquid crystal cell can be adjusted more accurately.

APPLIED EXAMPLE 20

In the above-described method of manufacturing the liquid crystal device, the first optical element is arranged in a position so as to not overlap with the liquid crystal layer in the plan view.

According to the configuration of Applied Example 20, even when the first polarizer is arranged on the outer side of any substrate between the first substrate and the second substrate, the liquid crystal layer is not interposed between the first optical element and the first polarizer. Thus, when the optical axis of the first polarizer is optically adjusted to a predetermined position by using the optical axis of the first optical element as the reference, the optical influence of the liquid crystal layer is excluded.

APPLIED EXAMPLE 21

In the above-described method of manufacturing the liquid crystal device, the first substrate has a protruding portion that does not overlap with the second substrate in the plan view, and the first optical element is disposed in the protruding portion.

According to the configuration of Applied Example 21, even when the first polarizer is arranged on the outer side of any substrate between the first substrate and the second substrate, the first optical element does not overlap with the liquid crystal layer and the second substrate in the plan view. Accordingly, the liquid crystal layer and the second substrate are not interposed between the first optical element and the first polarizer. Thus, when the optical axis of the first polarizer is optically adjusted to a predetermined position by using the optical axis of the first optical element as the reference, the optical influence of the liquid crystal layer and the second substrate is excluded. Accordingly, the position of the first polarizer relative to the liquid crystal cell can be adjusted more accurately.

APPLIED EXAMPLE 22

In the above-described method of manufacturing the liquid crystal device, the liquid crystal cell includes a reflective display area arranged in the display area that contributes to display, and the first optical element is arranged in the reflective display area.

According to the configuration of Applied Example 22, when the position of the first polarizer is adjusted in the semi-transmissive reflection-type liquid crystal device, the optical element that is arranged in the reflective display area can be used as the reference for the position adjustment.

APPLIED EXAMPLE 23

In the above-described method of manufacturing the liquid crystal device, the liquid crystal cell includes a reflective display area that is arranged in the display area contributing to display; and a second optical element that is disposed in the reflective display area of the first substrate and has a polarization separation function.

According to the configuration of Applied Example 23, when the first optical element that is used as the reference for positional adjustment of the first polarizer and the second optical element that is disposed in the reflective display area are configured to have a same configuration, the first optical element can be formed in the same process as used for forming the second optical element.

APPLIED EXAMPLE 24

The above-described method of manufacturing the liquid crystal device, after determining the relative positional relationship and attaching the first polarizer, further includes: measuring the intensity of light transmitted through an area of the liquid crystal cell in which the first optical element is not disposed, the first polarizer, and a second polarizer by rotating at least one between the liquid crystal cell and the second polarizer within an opposing face in a state in which the second polarizer is arranged on an outer side of the other substrate between the first substrate and the second substrate of the liquid crystal cell, so as to oppose the other substrate; and determining the relative positional relationship of the based on the result of measurement of the intensity of the light and attaching the second polarizer to the other substrate of the liquid crystal cell.

According to the configuration of Applied Example 24, the optical axis of the second polarizer is optically adjusted to a predetermined position for the liquid crystal cell to which the first polarizer is attached, with the optical axis thereof adjusted to a predetermined position in the determining of the relative positional relationship of the first polarizer. Accordingly, any positional deviation between the liquid crystal cell and the second polarizer can be decreased.

APPLIED EXAMPLE 25

In the above-described method of manufacturing the liquid crystal device, at least one out of the first polarizer and the second polarizer may include a polarizing plate and an optical compensation plate that is laminated on the polarizing plate.

According to the configuration of Applied Example 25, even when the polarizer does include the polarizing plate and the optical compensation plate, any relative positional deviation among the liquid crystal cell, the first polarizer, and the second polarizer can be decreased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
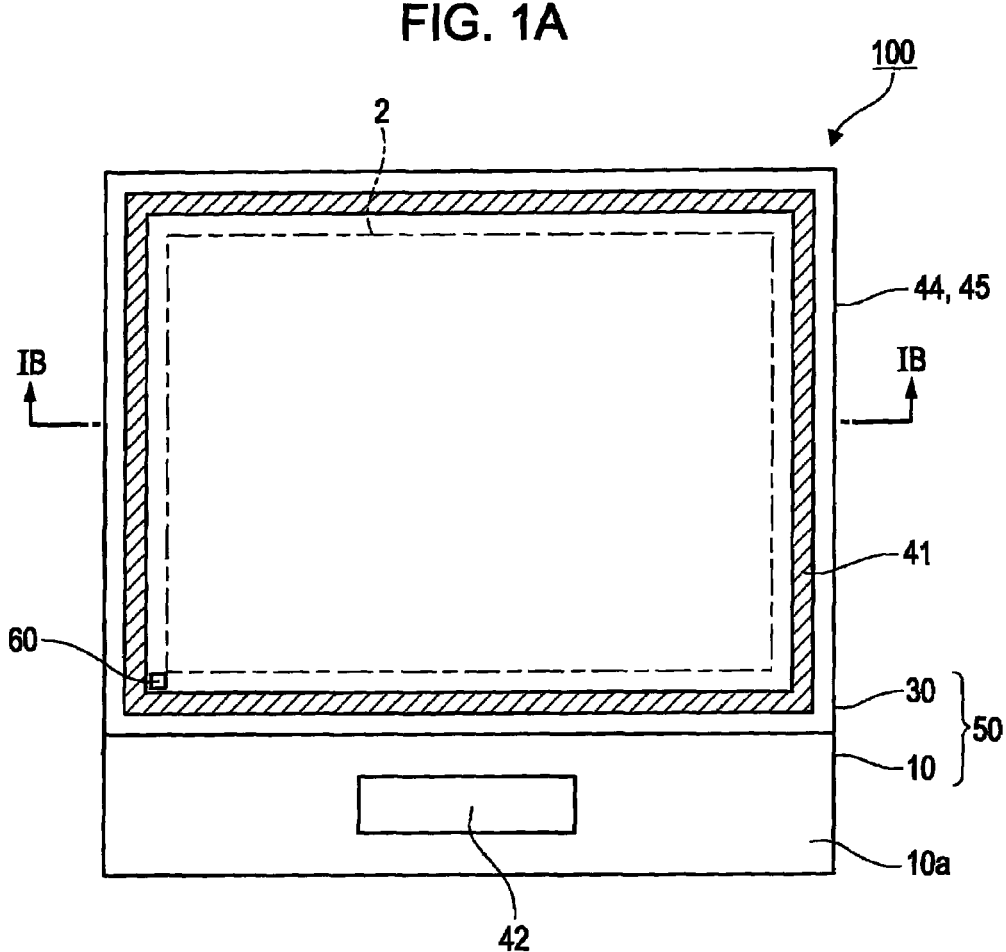
FIGS. 1A and 1B are diagrams showing a schematic configuration of a liquid crystal device according to a first embodiment of the invention.

Hereinafter, embodiments of the invention will be described with reference to the accompanying drawings. In the drawings to be referred to, in order to represent the configurations so as to be easily understood, the layer thicknesses and the ratios of the sizes of constituent elements, angles, and the like are differently represented appropriately.

First Embodiment

<Liquid Crystal Device>

Figure 1B:
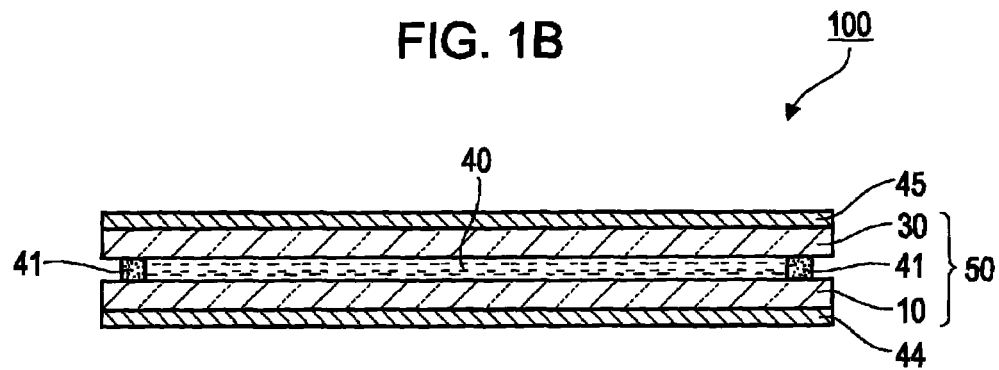
Figure 2:
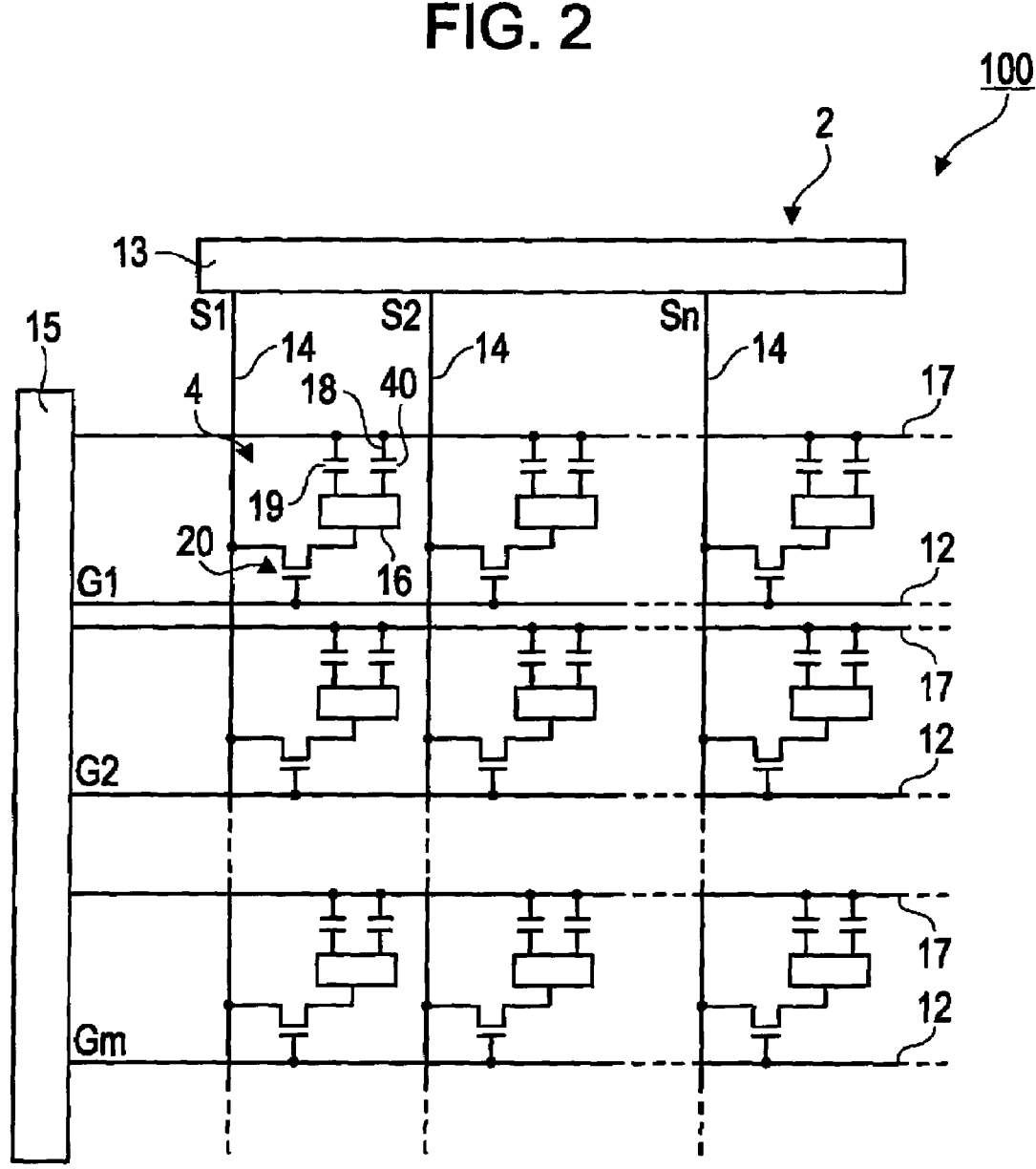
FIG. 2 is an equivalent circuit diagram showing the electrical configuration of the liquid crystal device according to the first embodiment.
Figure 3A:
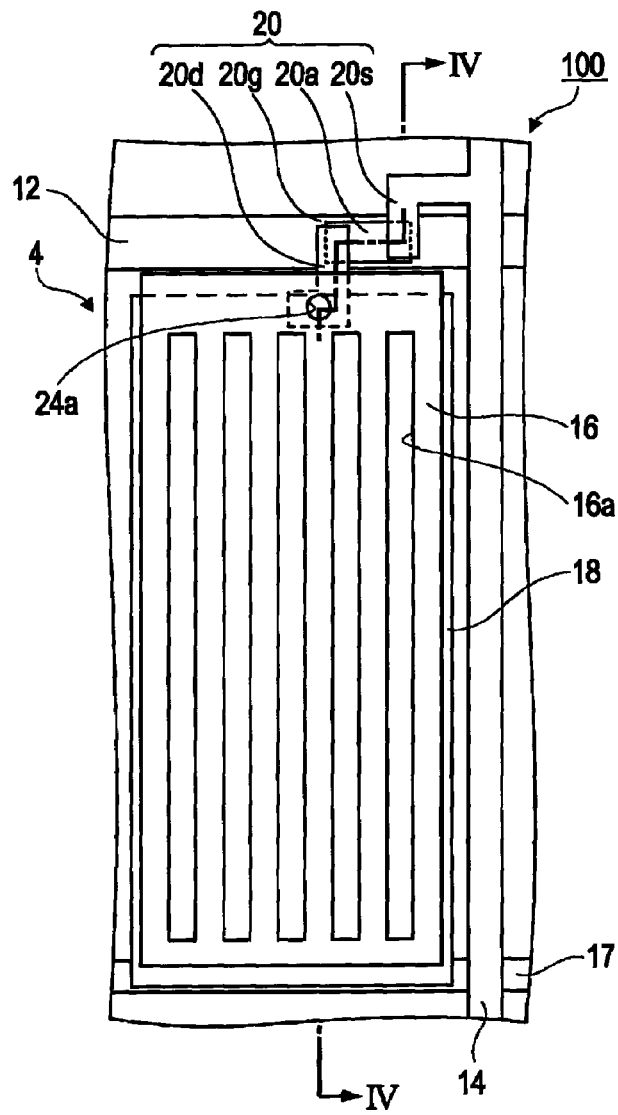
FIGS. 3A and 3B are diagrams showing the pixel configuration of the liquid crystal device according to the first embodiment.
Figure 3B:
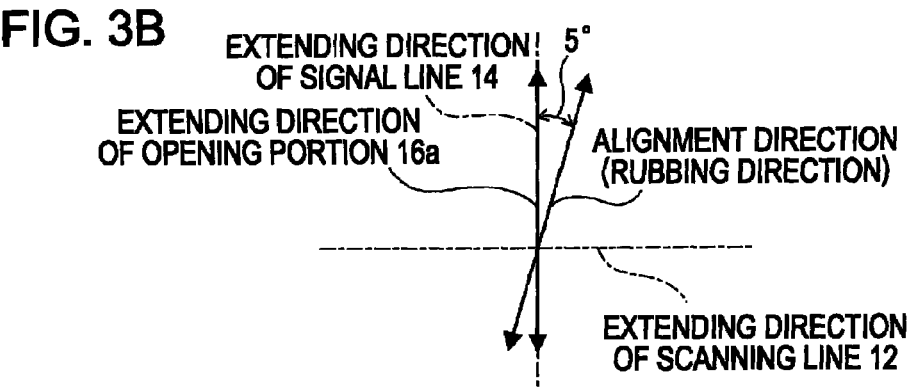
Figure 4:
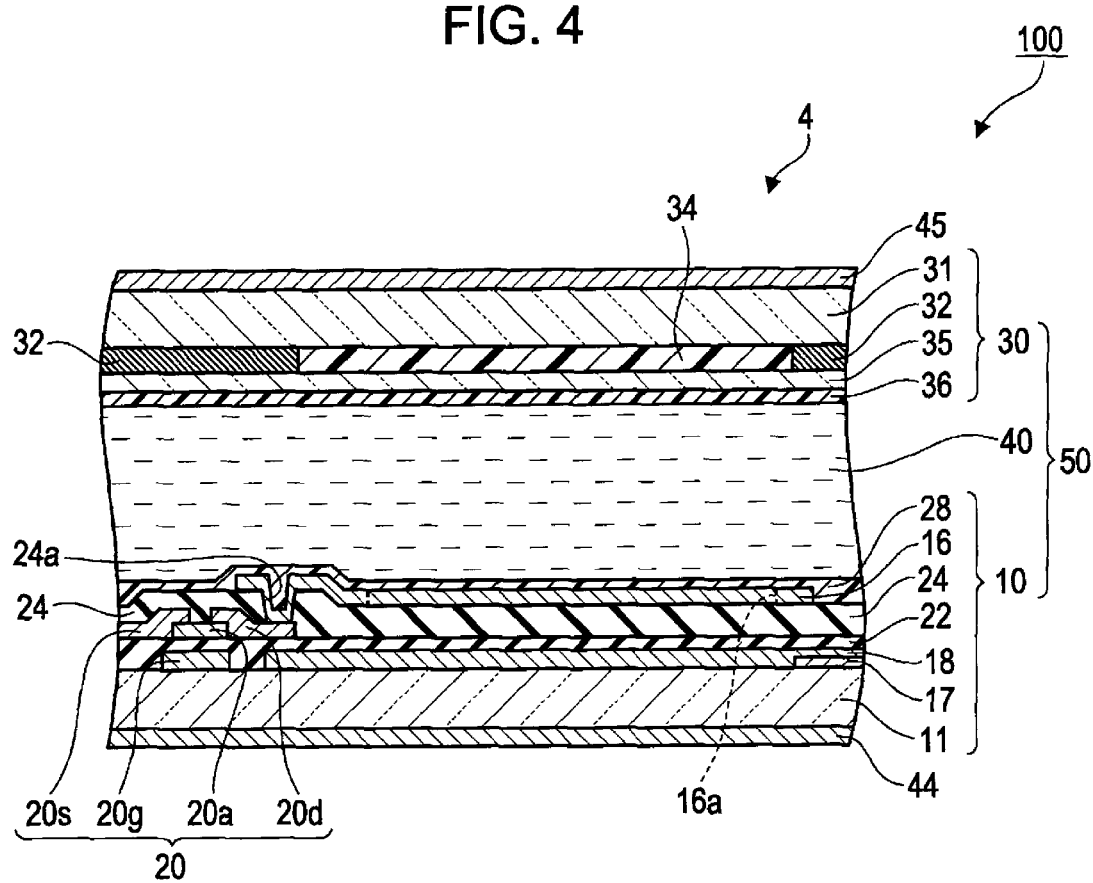
FIG. 4 is a cross-sectional view taken along line IV-IV shown in FIG. 3A.

First, a liquid crystal device according to a first embodiment of the invention will be described with reference to the drawings. FIGS. 1A and 1B are diagrams showing a schematic configuration of the liquid crystal device according to the first embodiment. In particular, FIG. 1A is a plan view of the liquid crystal device, and FIG. 1B is a cross-sectional view taken along line IB-IB shown in FIG. 1A. FIG. 2 is an equivalent circuit diagram showing the electrical configuration of the liquid crystal device according to the first embodiment. FIGS. 3A and 3B are diagrams showing the pixel configuration of the liquid crystal device according to the first embodiment. In particular, FIG. 3A is a plan view showing the pixel configuration for the case where the liquid crystal device is viewed from an opposing substrate side, and FIG. 3B is a diagram showing the aligning direction of a liquid crystal cell. FIG. 4 is a cross-sectional view taken along line IV-IV shown in FIG. 3A. In FIG. 3A, the opposing substrate is omitted in drawing.

The liquid crystal device 100 according to the first embodiment, for example, is a liquid crystal device of an active matrix type that has a TFT (thin film transistor) element as a switching element. In addition, the liquid crystal device 100 is a transmission-type liquid crystal device of an FFS (fringe-field switching) type.

As shown in FIGS. 1A and 1B, the liquid device 100 includes a liquid crystal cell 50. The liquid crystal cell 50 includes a component substrate 10 as a first substrate, an opposing substrate 30 as a second substrate that is arranged so as to face the component substrate 10, and a liquid crystal layer 40 that is pinched between the component substrate 10 and the opposing substrate 30. The component substrate 10 and the opposing substrate 30 are bonded together so as to face each other through a frame-shaped sealing member 41. The liquid crystal layer 40 is enclosed in a space that is surrounded by the component substrate 10, the opposing substrate 30, and the sealing member 41.

A display area 2 is an area that contributes to display in the liquid crystal device 100. The display area 2 is located within an area that is surrounded by the sealing member 41, that is, an area in which the liquid crystal layer 40 is sealed. In the component substrate 10, a wire grid polarizer 60 as a first optical element is disposed. The wire grid polarizer 60 is arranged in an area that is surrounded by the sealing member 41 and is located outside the display area 2. The wire grid polarizer 60 has a polarization separation function.

The component substrate 10 is larger than the opposing substrate 30 and has an extrusion portion 10a that is a portion extruding from the opposing substrate 30. In this protrusion portion 10a, a driver IC 42 that is used for driving the liquid crystal layer 40 is mounted.

As shown in FIG. 1B, on the outer side of the component substrate 10, a polarizing plate 44 is arranged as a first polarizer. On the outer side of the opposing substrate 30, a polarizing plate 45 is arranged as a second polarizer. Although not shown in the figure, on the polarizing plate 44 side, an illumination device such as a back light is arranged so as to face the polarizing plate 44.

As shown in FIG. 2, in the display area 2, a plurality of scanning lines 12, a plurality of signal lines 14, and a plurality of common wirings 17 are formed. The plurality of scanning lines 12 and the plurality of common wirings 17 are arranged so to be approximately parallel to one another. The plurality of signal lines 14 is disposed so as to intersect the plurality of scanning lines 12 and the plurality of common wirings 17. In addition, pixels 4 are arranged to correspond with intersections of the scanning lines 12, the common wirings 17, and the signal lines 14.

The pixels 4 are arranged in a matrix shape, so that a gap is formed between the adjacent pixels 4. The pixel 4 contributes to the display of one color out of a red color (R), a green color (G), and a blue color (B). One pixel group is configured by three pixels 4 that contribute to display of the colors R, G, and B. In the liquid crystal display 100, display of various colors can be performed by appropriately changing the luminance of three pixels 4 of each pixel group.

In each pixel 4, a pixel electrode 16 and a TFT element 20 that is used for controlling the pixel electrode 16 are formed. In addition, in each pixel 4, a common electrode 18 that is used for generating a horizontal electric field between the pixel electrode 16 and the common electrode 18 is formed. The common electrode 18 is electrically connected to the common wiring 17.

The source electrode 20s (see FIG. 3A) of the TFT element 20 is electrically connected to the signal line 14 that extends from a signal line driving circuit 13. In addition, data signals S1, S2, . . . , Sn are supplied to the signal lines 14 from the signal line driving circuit 13 in a line sequential manner. The gate electrode 20g (see FIG. 3A) of the TFT element 20 is a part of the scanning line 12 that extends from a scanning line driving circuit 15. In addition, scanning signals G1, G2, . . . , Gm are supplied to the scanning lines 12 from a scanning line driving circuit 15 in a line sequential manner. The drain electrode 20d (see FIG. 3A) of the TFT element 20 is electrically connected to the pixel electrode 16.

The data signals S1, S2, . . . , Sn are written into the pixel electrodes 16 through the signal lines 14 at a predetermined time by turning on the TFT elements 20 for a predetermined period. The data signal of a predetermined level that is written into the liquid crystal layer 40 through the pixel electrodes 16 is maintained for a predetermined period between the liquid crystal layer 40 and the common electrode 18. Here, between the pixel electrode 16 and the common electrode 18, a holding capacitor 19 is formed, and the voltage of the pixel electrode 16, for example, is maintained for a time longer than the time during which the source voltage is applied. Accordingly, the electric charge holding characteristic is improved, and whereby the liquid crystal device 100 can perform display with a high contrast ratio.

Next, the configuration of the liquid crystal device 100 will be described. As shown in FIG. 3A, in the pixel 4, the pixel electrode 16, the common electrode 18 that is used for generating a horizontal electric field between the pixel electrode 16 and the common electrode 18, and the TFT element 20 that is used for controlling the pixel electrode 16 are disposed.

The pixel electrode 16 is formed in a rectangular shape and has a plurality of opening portions 16a formed in a slit shape. The opening portions 16a formed in the slit shape, for example, are formed to be parallel to one another in a direction along the extending direction of the signal line 14. The pixel electrode 16 is electrically connected to the drain electrode 20d of the TFT element 20 through a contact hole 24a which passing through an insulating layer 24 (see FIG. 4). The pixel electrode 16 is formed from a conductive material having transparency. For example, the pixel electrode 16 is formed of ITO (Indium Tin Oxide).

The common electrode 18 is formed in a rectangular shape and is disposed so as to overlap with the pixel electrode 16 in the plan view. The common electrode 18 overlaps with the common wiring 17 in one side portion thereof and is electrically connected to the common wiring 17 in the side portion. The common electrode 18 is formed of a conductive material having transparency. For example, the common electrode 18 is formed of ITO (Indium Tin Oxide).

The TFT element 20 includes a gate electrode 20g, a semiconductor layer 20a, a source electrode 20s, and a drain electrode 20d. The gate electrode 20g is a part of the scanning line 12. The semiconductor layer 20a is formed in a position overlapping with the gate electrode 20g in the plan view. The source electrode 20s is a part that is branched from the signal line 14. A part of the source electrode 20s is formed so as to cover a part (the source side) of the semiconductor layer 20a. In addition, a part of the drain electrode 20d is formed so as to cover a part (the drain side) of the semiconductor layer 20a.

As shown in FIG. 4, the component substrate 10 is configured by using a substrate 11 as a base body. The component substrate 10 includes a TFT element 20, a common wiring 17, a common electrode 18, a gate insulating layer 22, an insulating layer 24, a pixel electrode 16, an alignment film 28, and a wire grid polarizer 60, which are all disposed on the substrate 11 (see FIG. 5). The substrate 11 is formed of a material having transparency such as glass, quartz, resin, or the like. The substrate 11 may be configured so as to be covered with an insulating layer that is formed of a silicon dioxide ($SiO_2$) film or the like.

On the liquid crystal layer 40 side of the substrate 11, a gate electrode 20g, a common wiring 17, and a common electrode 18 are formed. The gate insulating layer 22 is formed so as to cover the substrate 11, the gate electrode 20g, the common wiring 17, and the common electrode 18. On the gate insulating layer 22, the semiconductor layer 20a, the source electrode 20s, and the drain electrode 20d are formed.

The insulating layer 24 is formed so as to cover the gate insulating layer 22, the semiconductor layer 20a, the source electrode 20s, and the drain electrode 20d. The pixel electrode 16 is formed on the insulating layer 24. The pixel electrode 16 and the common electrode 18 face each other through the gate insulating layer 22 and the insulating layer 24. In addition, a holding capacitor that uses the gate insulating layer 22 and the insulating layer 24, which are interposed between the pixel electrode 16 and the common electrode 18, as a dielectric film is formed.

When a voltage is applied between the pixel electrode 16 and the common electrode 18 in the component substrate 10, a horizontal electric field that is formed in a direction parallel to the component substrate 10 is generated in the slit-shaped opening portion 16a and near the opening portion 16a. The alignment of liquid crystal molecules of the liquid crystal layer 40 is controlled in accordance with the horizontal electric field. However, the arrangement of the pixel electrode 16 and the common electrode 18 is not limited to the above-described form. Thus, the common electrode 18 may be arranged to the liquid crystal layer 40 side relative to the pixel electrode 16. Under such a configuration, the common electrode 18 has a slit-shaped opening portion.

In addition, on the side of the component substrate 10 that is brought into contact with the liquid crystal layer 40, an alignment film 28 is formed. The alignment film 28, for example, is formed of polyimide resin. On the surface of the alignment film 28, an alignment process such as a rubbing process is performed, for example, with a direction which forms an angle of 5 degrees in the clockwise direction with respect to the extending direction of the signal line 14 used as an aligning direction (see FIG. 3B).

In addition, the opposing substrate 30 is located on the observation side of the liquid crystal device 100. The opposing substrate 30 is configured by using the substrate 31 as a base body. The opposing electrode 30 includes a light shielding layer 32, a color filter layer 34, an overcoat layer 35, and an alignment film 36, which are all disposed on the substrate 31.

The substrate 31 is formed of a material having transparency. The substrate 31, for example, is formed of glass, quartz, resin, or the like. The light shielding layer 32 and the color filter layer 34 are formed on the substrate 31. The light shielding layer 32 is arranged in an area interposed among adjacent pixels 4 located on the substrate 31. The color filter layer 34 is arranged to correspond with the area of the pixel 4. The color filter layer 34, for example, is formed of acrylic resin or the like. The color filter layer 34 contains coloring materials corresponding to the colors of R, G, and B. The overcoat layer 35 is formed so as to cover the light shielding layer 32 and the color filter layer 34.

On the side of the opposing substrate 30 that is brought into contact with the liquid crystal layer 40, the alignment film 36 is formed. The alignment film 36, for example, is formed of polyimide resin. For the surface of the alignment film 36, an aligning process such as a rubbing process is performed, for example, in a direction that is different from the rubbing direction of the alignment film 28 by 180 degrees, with a direction which forms an angle of 5 degrees in the clockwise direction with respect to the extending direction of the signal line 14 used as the aligning direction (see FIG. 3B).

The liquid crystal layer 40 is arranged between the component substrate 10 and the opposing substrate 30. The liquid crystal molecules of the liquid crystal layer 40 are horizontally aligned along the aligning direction (see FIG. 3B) that is regulated by the aligning process performed for the alignment film 28 and the alignment film 36, in a state (OFF state) in which no electric field is generated between the pixel electrode 16 and the common electrode 18. On the other hand, the liquid crystal molecules of the liquid crystal layer 40 are aligned along an electric field that is generated in a direction perpendicular to the extending direction of the opening portion 16a, in a state (ON state) in which an electric field is generated between the pixel electrode 16 and the common electrode 18. As described above, a phase difference is given to light passing through the liquid crystal layer 40 in the liquid crystal layer 40 by using birefringence that is based on a difference between the aligning states of the liquid crystal molecules in the ON state and the OFF state.

Figure 5A:
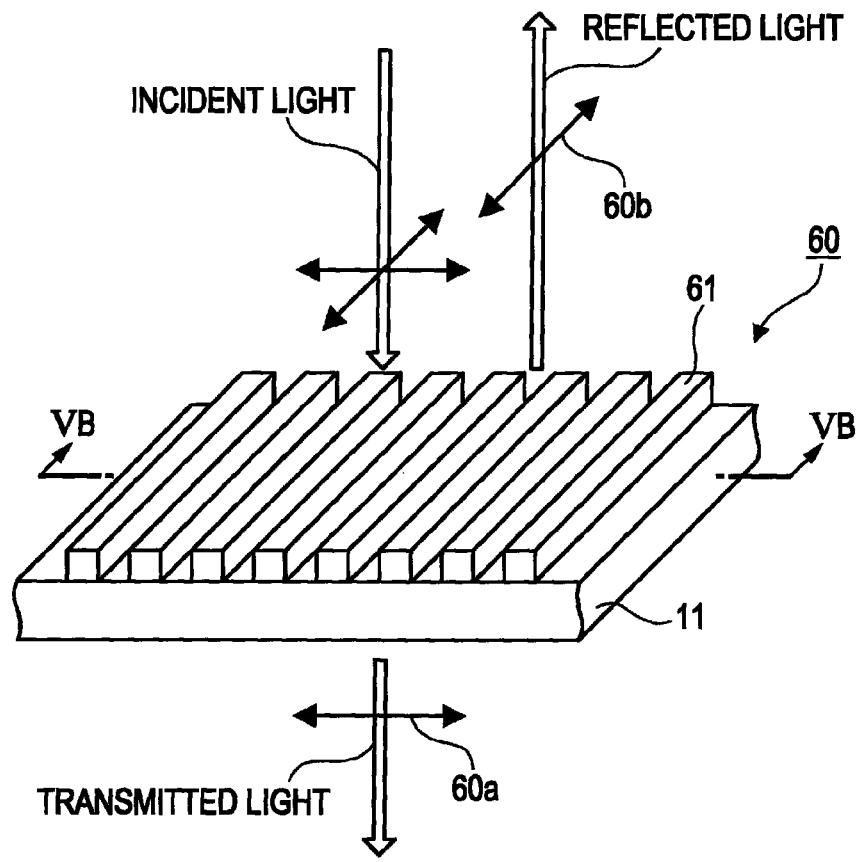
FIGS. 5A and 5B are diagrams showing a wire grid polarizer according to the first embodiment.
Figure 5B:
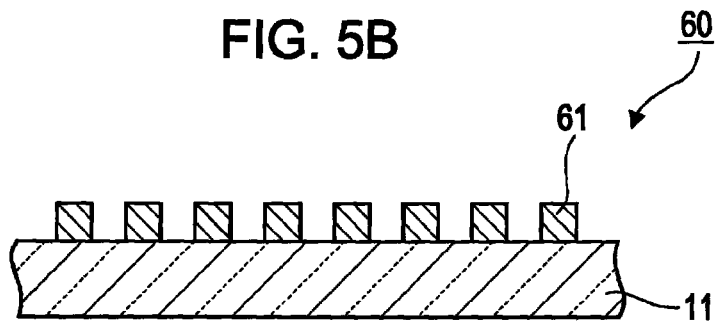

Next, the wire grid polarizer 60 will be described. FIGS. 5A and 5B are diagrams showing the wire grid polarizer 60 according to the first embodiment. In particular, FIG. 5A is a perspective view showing a schematic configuration of the wire grid polarizer 60, and FIG. 5B is a cross-sectional view taken along line VB-VB shown in FIG. 5A.

As shown in FIGS. 5A and 5B, the wire grid polarizer 60 includes a plurality of metal reflection films 61 that are arranged in a stripe pattern. The metal reflection film 61 has a linear shape. The metal reflection films 61 are arranged on the substrate 11 so as to be approximately parallel to one another.

The metal reflection film 61 is formed of metal having high light reflectivity. For example, the metal reflection film 61 is formed of aluminum. In addition, the material of the metal reflection film 61 may be APC (alloy of silver-palladium-copper) or the like.

The metal reflection films 61 are arranged in a predetermined pitch. The arrangement pitch of the metal reflection films 61 is set to be smaller than the wavelength of incident light. For example, the arrangement pitch of the metal reflection films 61 is about 40 nm to 140 nm. The height of the metal reflection film 61, for example, is about 100 nm. The width of the metal reflection film 61, for example, is about 100 nm.

The wire grid polarizer 60 is formed during a process in which the TFT element 20 and the like are formed in the semiconductor process. Accordingly, the wire grid polarizer 60 is formed at a precision that is equivalent to that of the TFT element 20 and the like. In addition, the wire grid polarizer 60 is formed to be aligned to a mark or the like that is disposed on the component substrate 10 for alignment (positional adjustment) performed at the time when the component substrate 10 and the opposing substrate 30 are bonded together.

The wire grid polarizer 60 has a function for dividing the incident light into reflected light and transmitted light that have different polarized states. The wire grid polarizer 60 reflects the polarized component of the incident light that is parallel to the extending direction of the metal reflection film 61 and transmits a polarized component that is perpendicular to the extending direction of the metal reflection film 61. In other words, the wire grid polarizer 60 has a transmission axis 60*a* and a reflection axis 60*b* as optical axes. As shown in FIG. 5A, the transmission axis 60*a* is perpendicular to the extending direction of the metal reflection film 61, and the reflection axis 60*b* is parallel to the extending direction of the metal reflection film 61.

In addition, the metal reflection film 61 may be formed on the gate insulating layer 22 or the insulating layer 24. In addition, the metal reflection film 61 may be covered with a protective layer that is formed from silicon dioxide ($SiO_2$) or the like.

Figure 6A:
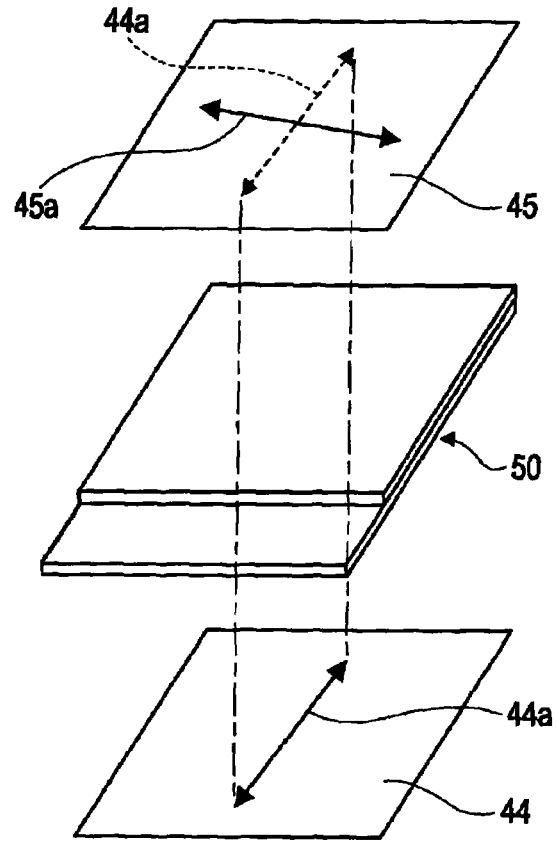
FIGS. 6A and 6B are diagrams showing the condition of the optical design of the liquid crystal device.
Figure 6B:
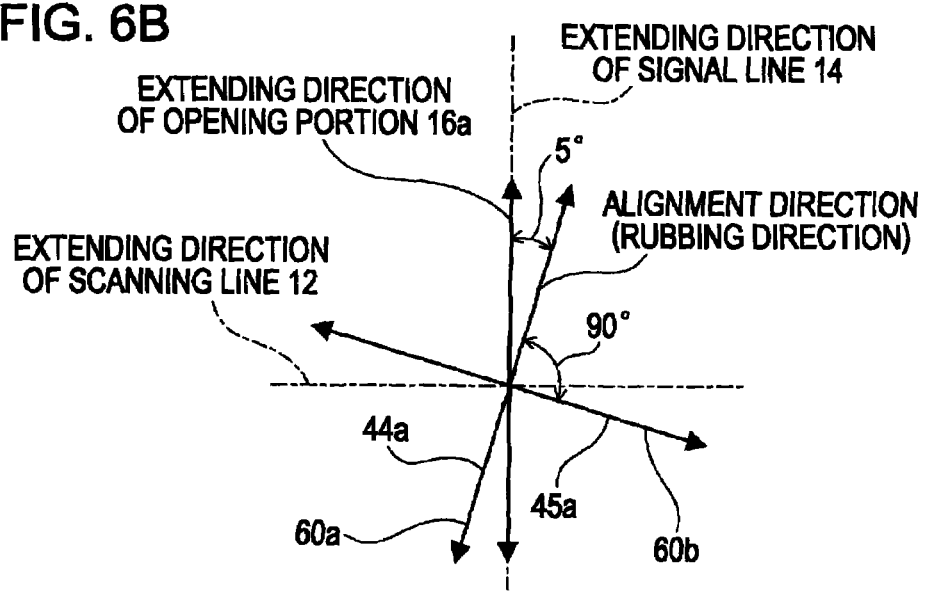

Next, the condition of the optical design of the liquid crystal device 100 will be described. FIGS. 6A and 6B are diagrams showing the condition of the optical design of the liquid crystal device 100. The polarizing plates 44 and 45 each have a transmission axis and an absorption axis as optical axes. FIG. 6A shows the transmission axis 44*a* of the polarizing plate 44 and the transmission axis 45*a* of the polarizing plate 45. The transmission axis 44*a* of the polarizing plate 44 and the transmission axis 45*a* of the polarizing plate 45 are arranged so as to be perpendicular to each other.

As shown in FIG. 6B, the slit-shaped opening portion 16*a* of the pixel electrode 16 extends along the extending direction of the signal line 14. The direction of an electric field that is generated in the ON state between the pixel electrode 16 and the common electrode 18 is at a direction perpendicular to the extending direction of the signal line 14, that is, a direction along the extending direction of the scanning line 12. The rubbing direction of the alignment films 28 and 36 is at a direction forming an angle of 5 degrees in the clockwise direction with respect to the extending direction of the signal line 14 (the opening portion 16*a*).

The transmission axis 60*a* of the wire grid polarizer 60 is arranged so as to be parallel to the rubbing direction of the alignment films 28 and 36. Accordingly, the transmission axis 60*a* of the wire grid polarizer 60 is at a direction forming an angle of 5 degrees in the clockwise direction with respect to the extending direction of the signal line 14 (the opening portion 16*a*). The reflection axis 60*b* of the wire grid polarizer 60 is at a direction perpendicular to the rubbing direction of the alignment films 28 and 36 and is at a direction forming an angle of 95 degrees in the clockwise direction with respect to the extending direction of the signal line 14 (the opening portion 16*a*).

The transmission axis 44*a* of the polarizing plate 44 is parallel to the rubbing direction of the alignment films 28 and 36, and the transmission axis 45*a* of the polarizing plate 45 is perpendicular to the rubbing direction of the alignment films 28 and 36. In other words, the transmission axis 44*a* of the polarizing plate 44 is parallel to the transmission axis 60*a* of the wire grid polarizer 60, and the transmission axis 45*a* of the polarizing plate 45 is perpendicular to the transmission axis 60*a* of the wire grid polarizer 60. Accordingly, linearly polarized light that is transmitted through the wire grid polarizer 60 is transmitted not through the polarizing plate 45 but through the polarizing plate 44.

When the transmission axes 44*a* and 45*a* of the polarizing plates 44 and 45 are in the predetermined positions, the light incident to the liquid crystal device 100 from the illumination device in the OFF state is converted into linearly polarized light that is parallel to the transmission axis 44*a* by the polarizing plate 44 so as to be incident to the liquid crystal layer 40. Then, the polarized direction of the linearly polarized light emitted from the liquid crystal layer 40 in the same polarized state is perpendicular to the transmission axis 45*a* of the polarizing plate 45. Accordingly, the linearly polarized light is blocked by the polarizing plate 45, and whereby the liquid crystal device 100 shows a dark display. As a result, the liquid crystal device 100 is in the normally-black mode.

When there is a deviation in the relative positional relationship of the rubbing directions of the alignment films 28 and 36 and the transmission axes 44*a* and 45*a* of the polarizing plates 44 and 45, a small amount of the light incident in the OFF state is transmitted. Accordingly, deterioration of the display quality occurs such as a decrease in the contrast or coloring of the background color. Therefore, it is important for acquiring the display quality of the liquid crystal device 100 to precisely adjust the relative positional relationship of the polarizing plates 44 and 45 with respect to the liquid crystal cell 50 such that the transmission axes 44*a* and 45*a* are arranged in predetermined positions of the optical design with respect to the rubbing directions of the alignment films 28 and 36 when the polarizing plates 44 and 45 are bonded to the liquid crystal cell 50.

Thus, in the liquid crystal device 100, the wire grid polarizer 60, which has the transmission axis 60*a* parallel to the rubbing direction of the alignment films 28 and 36, is disposed on the component substrate 10 as a reference for adjusting the position at the time when the polarizing plates 44 and 45 are bonded to the liquid crystal cell 50. In other words, by optically performing positional adjustment of the transmission axis of any one of the polarizing plates 44 and 45 with reference to the transmission axis 60*a* of the wire grid polarizer 60, the positional deviations of the polarizing plates 44 and 45 with respect to the liquid crystal cell 50 (the rubbing direction of the alignment films 28 and 36) can be decreased.

In addition, the condition of the optical design of the liquid crystal device 100, such as the extending direction of the opening portion 16*a* of the pixel electrode 16 or the rubbing direction of the alignment films 28 and 36, is not limited to the above-described form.

<Method of Manufacturing Liquid Crystal Device>

Figure 7:
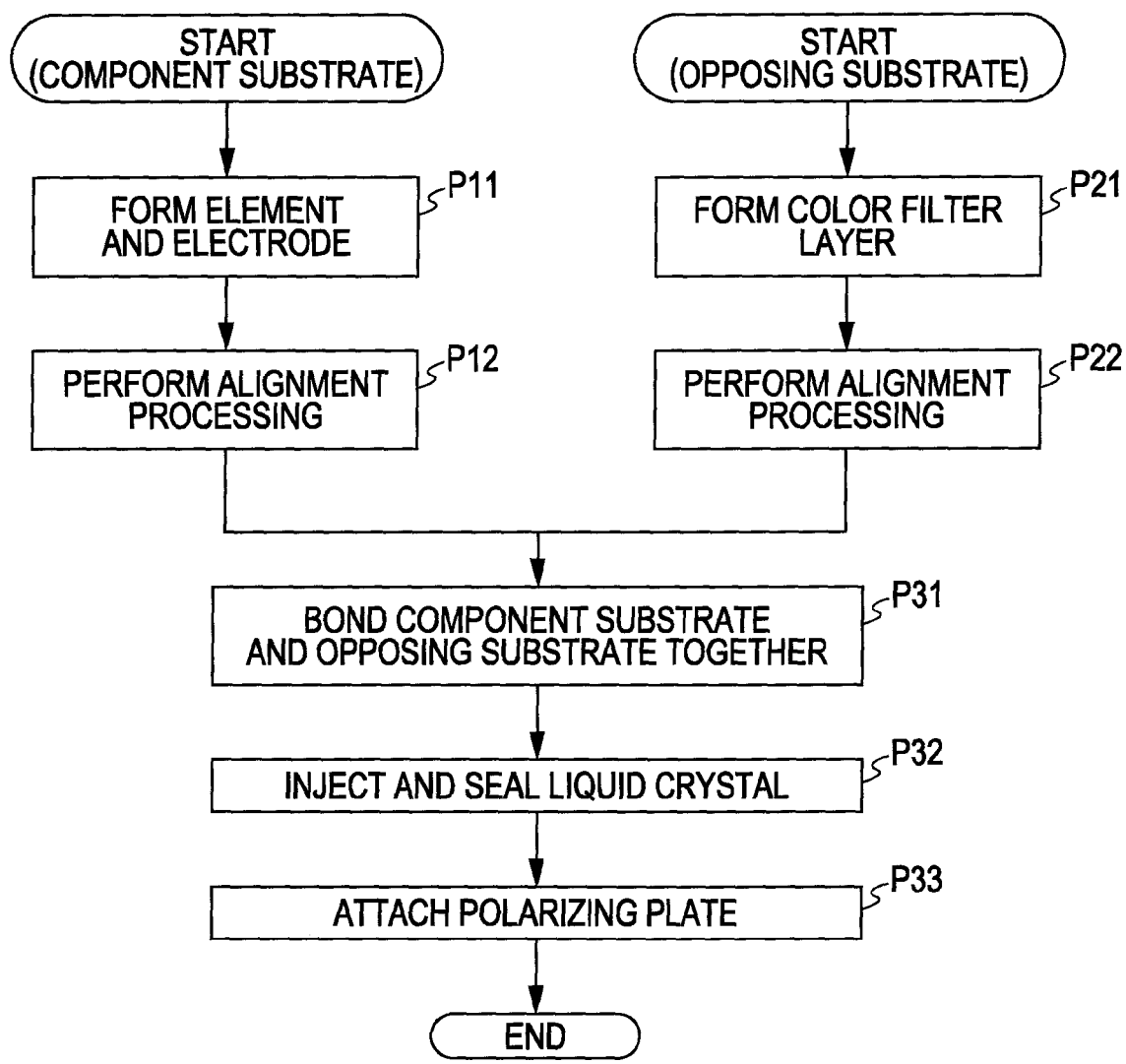
FIG. 7 is a flowchart showing a method of manufacturing the liquid crystal device according to the first embodiment.
Figure 8:
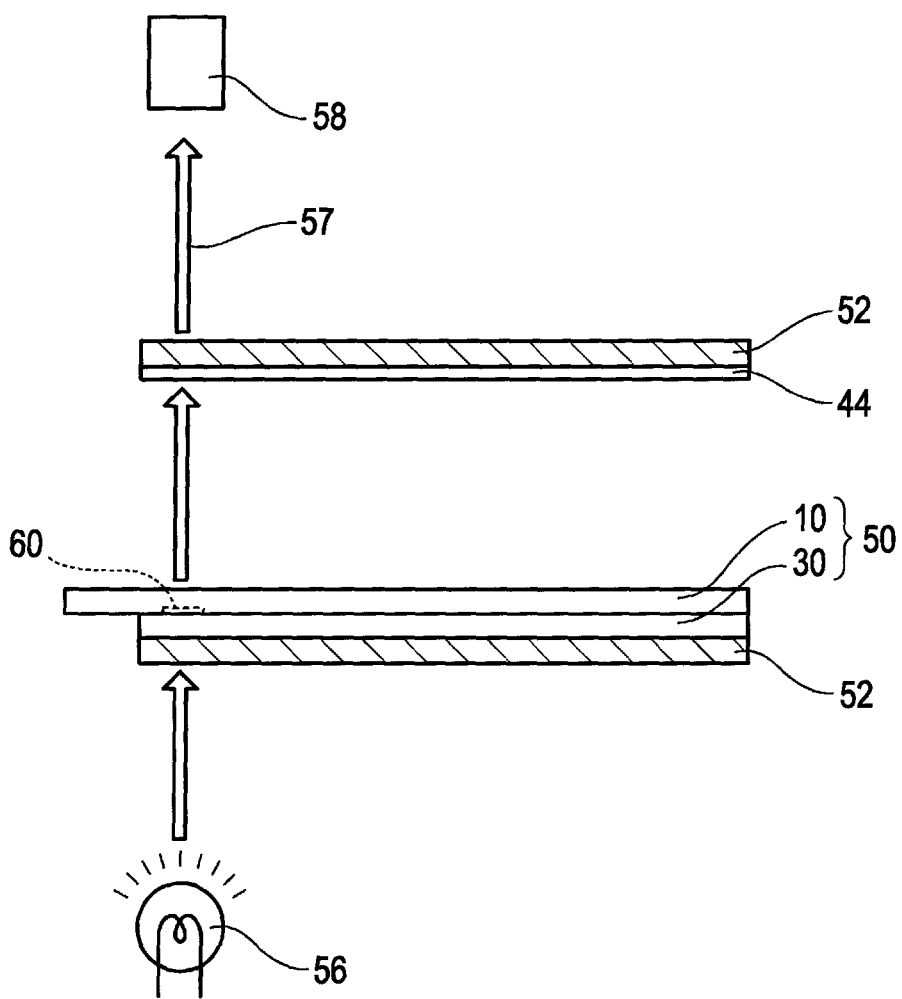
FIG. 8 is a diagram showing a method of attaching polarizing plates according to the first embodiment.
Figure 9:
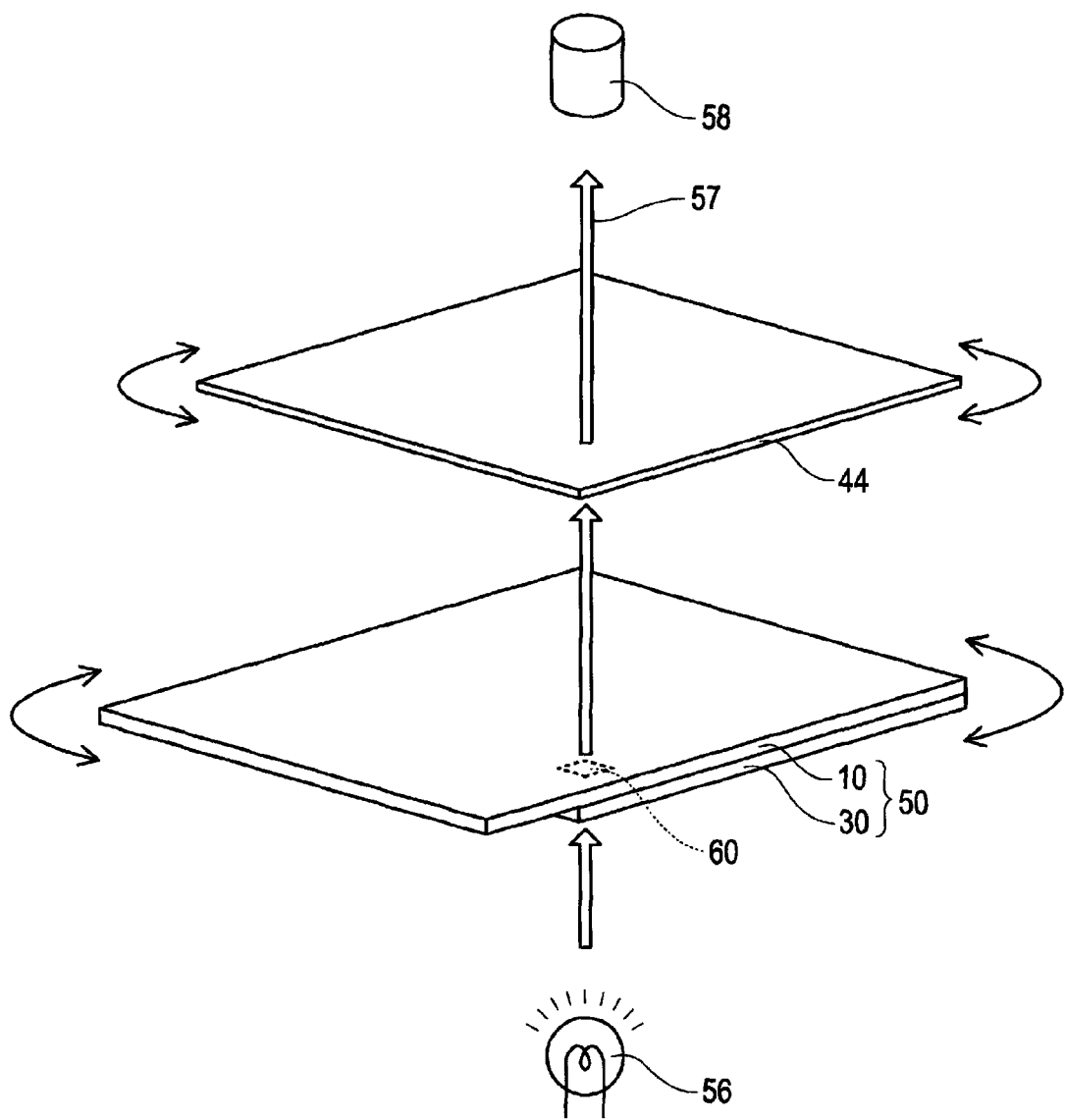
FIG. 9 is a diagram showing a method of attaching polarizing plates according to the first embodiment.
Figure 10:
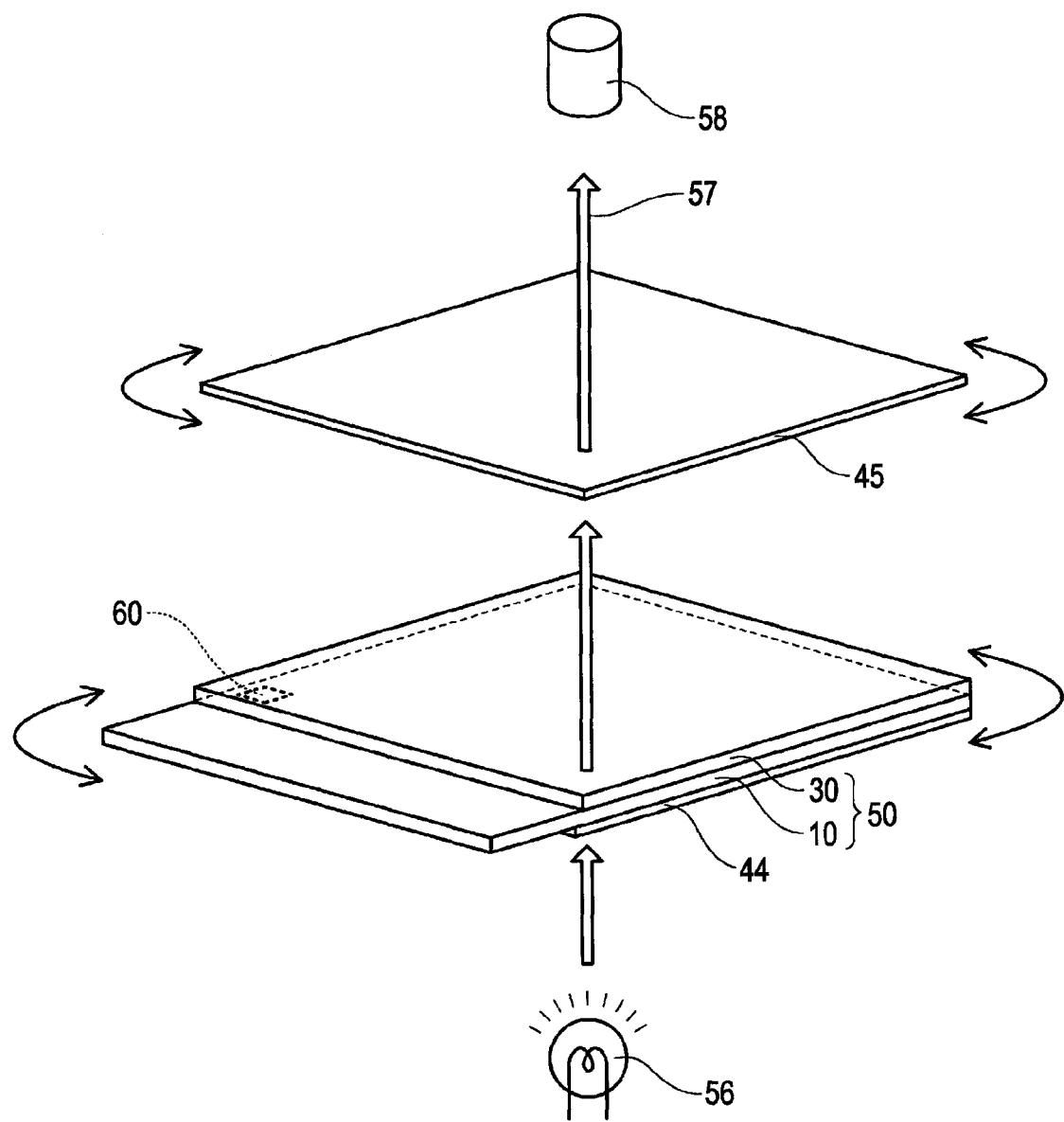
FIG. 10 is a diagram showing a method of attaching polarizing plates according to the first embodiment.

Next, a method of manufacturing the liquid crystal device according to the first embodiment will be described with reference to the drawings. FIG. 7 is a flowchart showing the method of manufacturing the liquid crystal device according to the first embodiment. FIGS. 8, 9, and 10 are diagrams showing a method of attaching the polarizing plates according to the first embodiment.

In FIG. 7, a process P11 and a process P12 are processes for manufacturing the component substrate 10, and a process P21 and a process P22 are processes for manufacturing the opposing substrate 30. The processes P11 and P12 and the processes P21 and P22 are performed independently. In addition, a process P31 and a process P32 are processes for preparing the liquid crystal cell 50 by combining the component substrate 10 and the opposing substrate 30. A process P33 is a process for attaching the pair of the polarizing plates 44 and 45 to the liquid crystal cell 50. In addition, known technology can be applied to processes among these processes that has not been described in detail.

First, the process for manufacturing the component substrate 10 and the process for manufacturing the opposing substrate 30 will be described. In the process P11, the TFT element 20, the common wiring 17, the common electrode 18, the gate insulating layer 22, the insulating layer 24, the pixel electrode 16, the wire grid polarizer 60, and the like are formed on the substrate 11.

Here, the wire grid polarizer 60 is formed during a process in which the TFT element 20 and the like are formed in the semiconductor process. In particular, by forming a metal thin film formed of the formation material of the wire grid polarizer 60 on the substrate 11 and patterning the metal thin film, for example, by using a photolithographic method, the wire grid polarizer 60 having a plurality of metal reflection films 61 that are arranged in a stripe shape is formed. Accordingly, the wire grid polarizer 60 can be formed with a precision that is equivalent to that of the TFT element 20 and the like without having to complicate the manufacturing process. As a method of forming the wire grid polarizer 60, a two-light flux interference exposure method by using a laser beam, an electron beam exposure method, or the like may be used.

Subsequently, in the process P12, the alignment film 28 is formed on the surface of the component substrate 10 on which the elements, the electrodes, and the like described above are formed, and a rubbing process is performed on the surface of the alignment film 28 in the direction shown in FIG. 6B.

Next, in the process P21, the light shielding layer 32, the color filter layer 34, and the overcoat layer 35, and the like are formed on the substrate 31. Subsequently, in the process P22, the alignment film 36 is formed on the surface of the opposing substrate 30, and a rubbing process is performed on the surface of the alignment film 36 in the direction shown in FIG. 6B.

Next, in the process P31, the component substrate 10 and the opposing substrate 30 are bonded together. The bonding process is performed by coating the component substrate 10 or the opposing substrate 30 with the sealing member 41, performing alignment for the component substrate 10 and the opposing substrate 30, and bringing the component substrate 10 and the opposing substrate 30 into contact with each other and pressed together. Subsequently, in the process P32, the liquid crystal is injected between the component substrate 10 and the opposing substrate 30 through the opening portion (injection port) in the sealing member 41, and the injection port is sealed. The liquid crystal cell 50 is prepared as described above.

Next, a method of attaching the polarizing plates in the process P33 will be described in detail with reference to FIGS. 8, 9, and 10. The process P33 includes a first process in which the polarizing plate 44 is arranged, a second process in which the polarizing plate 44 is attached to the liquid crystal cell 50, a third process in which the polarizing plate 45 is arranged, and a fourth process in which the polarizing plate 45 is attached to the liquid crystal cell 50.

In the first process, as shown in FIG. 8, the polarizing plate 44 is arranged on the outer side of the component substrate 10 of the liquid crystal cell 50. The liquid crystal cell 50 and the polarizing plate 44 are held so as to be parallel to each other by a holding part 52. The opposing substrate 30 side of the liquid crystal cell 50 is held, and the polarizing plate 44 is held so as to face the component substrate 10. In addition, the liquid crystal cell 50 and the polarizing plate 44 are held so as to be rotatable with the normal line of the surface (the surface of the component substrate 10 and the surface of the opposing substrate 30) of the liquid crystal cell 50 and the surface of the polarizing plate 44 used as a rotation axis.

The holding part 52, for example, has an adsorption hole or the like and is configured so as to be able to adsorb the liquid crystal cell 50 or the polarizing plate 44 so as to be fixed. The holding part 52, for example, is formed of a material having transparency. When the material of the holding part 52 is not transparent, a through hole or the like that allows light to be transmitted may be disposed in the holding part 52.

Subsequently, a light source 56 is arranged on the opposing substrate 30 side of the liquid crystal cell 50. In addition, a light receiving part 58 is arranged to the side of the polarizing plate 44 that is opposite to the liquid crystal cell 50. Then, light emitted from the light source 56 is allowed to be sequentially incident to the liquid crystal cell 50 and the polarizing plate 44. At this moment, the wire grid polarizer 60, which is disposed on the component substrate 10, is arranged so as to be positioned on the light path of the light emitted from the light source 56 toward the light receiving part 58.

Next, as shown in FIG. 9, while the liquid crystal cell 50 and the polarizing plate 44 are maintained so as to oppose each other, at least one out of the liquid crystal cell 50 and the polarizing plate 44 is rotated within the opposing face. Here, the liquid crystal cell 50 is fixed, and the polarizing plate 44 is rotated. Then, light 57, that is transmitted through an area of the liquid crystal cell 50 in which the wire grid polarizer 60 is arranged and the polarizing plate 44, is received by the light receiving part 58, and the intensity of the light 57 is measured. In FIG. 9, drawing of the holding part 52 is omitted.

As the light source 56, for example, a lamp emitting light that has the wavelength of the range of the visible light, a light emitting diode (LED), or a laser diode may be used. As the light receiving part 58, the intensity of the light 57 may be configured so as to be measured by converting the intensity of the light 57 into an electric signal, for example, by using a photo multi meter or the like. Alternatively, the luminance of the light 57 may be configured to be measured by using a luminance meter or the like as the light receiving part 58.

In addition, it is preferable that the light source 56 is arranged relative to the liquid crystal cell 50 such that the light emitted from the light source 56 is incident in the direction of the normal line of the liquid crystal cell 50. The positional relationship between the light source 56 and the light receiving part 58 may be vertically reversed to that shown in the figure.

Next, in the second process, the relative positional relationship of the face of the polarizing plate 44 with respect to the liquid crystal cell 50 is adjusted based on the result of measurement of the intensity of the light 57 such that the intensity of the light 57 reaches its maximum. At this moment, the intensity of the light 57 reaches its maximum in a position in which the transmission axis 44a of the polarizing plate 44 is parallel to the transmission axis 60a (see FIG. 6B) of the wire grid polarizer 60. This position in which the intensity of the light 57 reaches its maximum is a predetermined position in which the transmission axis 44a of the polarizing plate 44 is parallel to the rubbing direction of the alignment film 28.

When the intensity of the light 57 reaches its maximum, the relative positional relationship of the face of the polarizing plate 44 with respect to the wire grid polarizer 60 (the liquid crystal cell 50) is determined, and the polarizing plate 44 is attached to the component substrate 10 of the liquid crystal cell 50. At this moment, the polarizing plate 44 may be moved to the side of the liquid crystal cell 50 by the holding part 52, or the liquid crystal cell 50 may be moved to the side of the polarizing plate 44 by the holding part 52.

Next, in the third process, as shown in FIG. 10, the polarizing plate 45 is arranged on the side of the liquid crystal cell 50 that is opposite to the side to which the polarizing plate 44 of the liquid crystal cell 50 is attached, that is, the outer side of the opposing substrate 30 so as to face the opposing substrate 30. The liquid crystal cell 50 and the polarizing plate 45 are maintained so as to be parallel to each other. Although not shown in the figure, the liquid crystal cell 50 and the polarizing plate 45 are held by the holding part 52.

The light source 56 is arranged on the side of the liquid crystal cell 50 to which the polarizing plate 44 is attached, and the light receiving part 58 is arranged on the side of the polarizing plate 45 that is opposite to the liquid crystal cell 50. The positional relationship between the light source 56 and the light receiving part 58 may be vertically reversed. The light emitted from the light source 56 is allowed to be sequentially incident to the polarizing plate 44, the liquid crystal cell 50, and the polarizing plate 45. At this moment, the wire grid polarizer 60 is arranged so as not to be positioned in the light path of light emitted from the light source 56 toward the light receiving part 58.

Subsequently, while the liquid crystal cell 50 and the polarizing plate 45 are maintained so as to oppose each other, at least one between the liquid crystal cell 50 and the polarizing plate 45 is rotated within the opposing face. Then, light 57 that is transmitted through the area of the liquid crystal cell 50 in which the wire grid polarizer 60 is not arranged, the polarizing plate 44, and the polarizing plate 45 is received by the light receiving part 58, and the intensity of the light 57 is measured.

Next, in the fourth process, the relative positional relationship of the with respect to the polarizing plate 44 and the liquid crystal cell 50 is adjusted based on the result of measurement of the intensity of the light 57 such that the intensity of the light 57 reaches its minimum. At this moment, the transmission axis 44a of the polarizing plate 44 is arranged to be parallel to the rubbing direction (see FIG. 6B) of the alignment film 28 of the component substrate 10, and accordingly, the intensity of the light 57 reaches its minimum in a predetermined position in which the transmission axis 45a of the polarizing plate 45 is perpendicular to the transmission axis 44a of the polarizing plate 44 and the rubbing direction (see FIG. 6B) of the alignment film 36 of the opposing substrate 30.

When the intensity of the light 57 reaches its minimum, the relative positional relationship of the face of the polarizing plate 45 with respect to the polarizing plate 44 and the liquid crystal cell 50 is determined, and the polarizing plate 45 is attached to the opposing substrate 30 of the liquid crystal cell 50. The liquid crystal device 100 is completed as described above. In addition, when the polarizing plates 44 and 45 protrude from the external shape of the liquid crystal cell 50, the protruding portion may be cut off.

According to the above-described first embodiment, the following advantages are acquired.

(1) The relative positional relationship of the polarizing plate 44 with respect to the liquid crystal cell 50 is determined based on the result of measurement of the intensity of the light 57 transmitted through the area of the liquid crystal cell 50, in which the wire grid polarizer 60 is disposed, and the polarizing plate 44. Accordingly, the transmission axis 44a of the polarizing plate 44 can be optically adjusted to the predetermined position by using the transmission axis 60a of the wire grid polarizer 60 as a reference. Therefore, any relative positional deviation between the liquid crystal cell 50 and the polarizing plate 44 can be decreased. In addition, the liquid crystal cell 50, to which the transmission axis 44a of the polarizing plate 44 is adjusted and attached to the predetermined position, and the polarizing plate 45 are optically adjusted to the predetermined position. Accordingly, any positional deviation between the aligning direction of the liquid crystal cell 50 and the transmission axis 45a of the polarizing plate 45 can be decreased. As a result, any decrease in the display quality such as a decrease in the contrast of the liquid crystal device 100 or coloring of the background color is suppressed, and accordingly, the display quality of the liquid crystal device 100 can be improved.

(2) The positional adjustment of the polarizing plate 44 for the liquid crystal cell 50 and the attachment of the polarizing plate 44 to the liquid crystal cell 50 and the positional adjustment of the polarizing plate 45 for the liquid crystal cell 50 and the attachment of the polarizing plate 45 to the liquid crystal cell 50 are each performed in the same process. Accordingly, an increase in the number of processes due to the positional adjustment and the attachment can be suppressed.

(3) When the position of the polarizing plate 44 for the liquid crystal cell 50 is adjusted, the polarizing plate 44 is arranged to the outer side of the component substrate 10 on which the wire grid polarizer 60 is disposed. Accordingly, the liquid crystal layer 40 is not interposed between the wire grid polarizer 60 and the polarizing plate 44. Thus, when the transmission axis 44a of the polarizing plate 44 is optically adjusted to the predetermined position by using the transmission axis 60a of the wire grid polarizer 60 as a reference, the optical influence of the liquid crystal layer 40 is excluded. Accordingly, the positional adjustment of the polarizing plate 44 for the liquid crystal cell 50 can be performed more accurately.

(4) The positional relationship is determined in the second process such that the intensity of the light 57 transmitted through the area of the liquid crystal cell 50, in which the wire grid polarizer 60 is disposed, and the polarizing plate 44 reaches its maximum. Accordingly, when the intensity of the light 57 is measured, a measurement device that has high sensitivity for the high light-intensity side can be used appropriately.

In addition, the liquid crystal device 100 may be configured such that the transmission axis 44a of the polarizing plate 44 is perpendicular to the rubbing direction (the transmission axis 60a of the wire grid polarizer 60) of the alignment films 28 and 36, and the transmission axis 45a of the polarizing plate 45 is parallel to the rubbing direction (the transmission axis 60a of the wire grid polarizer 60) of the alignment films 28 and 36. In such a case, in the second process of the process P33, the intensity of the light 57 reaches its minimum in a predetermined position in which the transmission axis 44a of the polarizing plate 44 is perpendicular to the rubbing direction (the transmission axis 60a of the wire grid polarizer 60) of the alignment film 28.

In addition, the liquid crystal device 100 may be in a normally-white mode in which light incident from the illumination device is transmitted in the OFF state so as to represent bright display. Even when the liquid crystal device 100 is in the normally-white mode, the method of manufacturing the liquid crystal device according to this embodiment can be applied to the liquid crystal device 100. When the liquid crystal device 100 is in the normally-white mode, the transmission axis of the polarizing plate 44 and the transmission axis of the polarizing plate 45 are arranged so as to be parallel to each other. Accordingly, in the fourth process of the process P33, the relative positional relationship of the polarizing plate 45 with respect to the polarizing plate 44 and the liquid crystal cell 50 is adjusted such that the intensity of the light 57 reaches its maximum. In such a case, the intensity of the light 57 reaches its maximum in a predetermined position in which the transmission axis 45a of the polarizing plate 45 is parallel to the transmission axis 44a of the polarizing plate 44 and the rubbing direction of the alignment film 36 of the opposing substrate 30.

In this embodiment, attachment of the polarizing plate 44 is performed beforehand in the second process of the process P33, and then, attachment of the polarizing plate 45 is performed in the fourth process. However, it may be configured that attachment of the polarizing plate 45 is performed in the second process, and then, attachment of the polarizing plate 44 is performed in the fourth process. However, in such a case, when the positional relationship of the polarizing plate 45 with respect to the wire grid polarizer 60 (the liquid crystal cell 50) is adjusted in the second process, the liquid crystal layer 40 and the opposing substrate 30 are interposed between the wire grid polarizer 60 and the polarizing plate 45.

Second Embodiment

<Liquid Crystal Device>

Figure 11A:
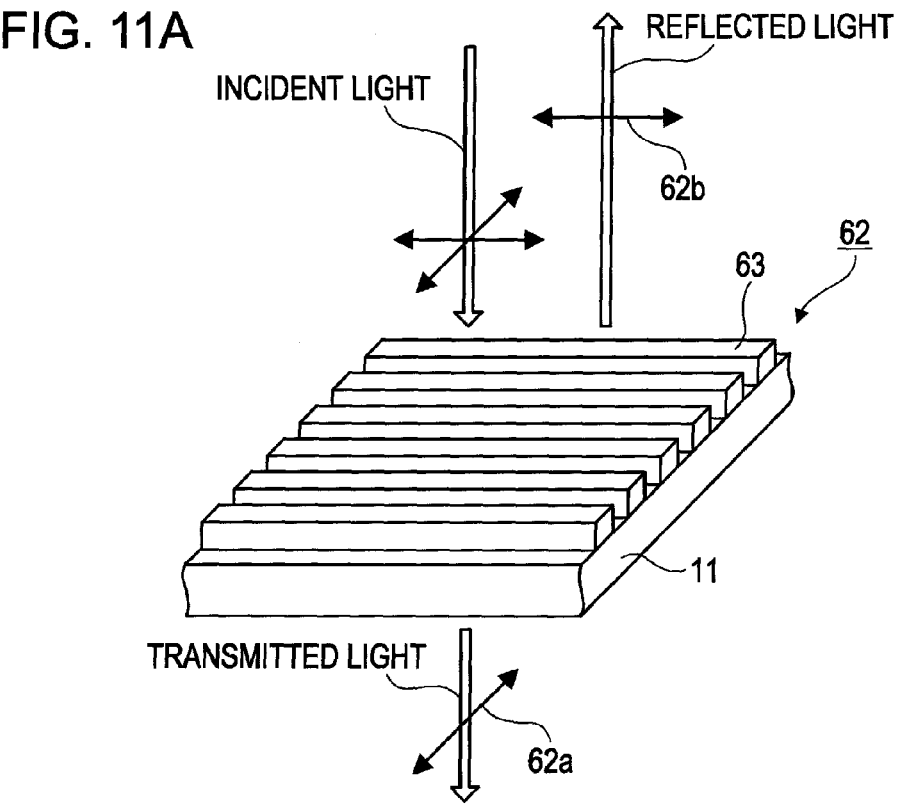
FIGS. 11A and 11B are diagrams showing a wire grid polarizer according to a second embodiment of the invention.
Figure 11B:
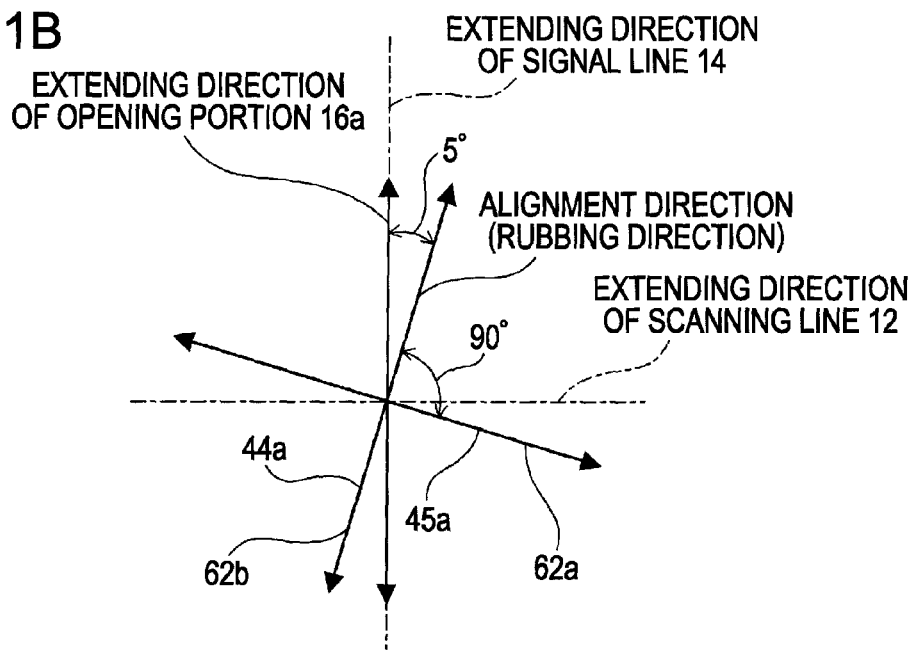

Next, a liquid crystal device according to a second embodiment of the invention will be described with reference to the drawings. FIGS. 11A and 11B are diagrams showing a wire grid polarizer according to the second embodiment. In particular, FIG. 11A is a perspective view showing a schematic configuration of the wire grid polarizer, and FIG. 11B is a diagram showing the condition of the optical design thereof.

The directions of the transmission and reflection axes of the wire grid polarizer of the liquid crystal device of the second embodiment are different from those of the liquid crystal device of the first embodiment. However, the other configurations of the second embodiment are the same as those of the first embodiment. To each constituent element that is common to the first embodiment, a same reference sign is attached, and a description thereof is omitted here.

As shown in FIG. 11A, the wire grid polarizer 62 that is included in the liquid crystal device according to the second embodiment includes a plurality of metal reflection films 63 that are arranged in a stripe shape. The wire grid polarizer 62 has a transmission axis 62a and a reflection axis 62b as optical axes.

As shown in FIG. 11B, the transmission axis 62a of the wire grid polarizer 62 is perpendicular to the rubbing direction of the alignment films 28 and 36 and is formed in a direction forming an angle of 95 degrees in the clockwise direction with respect to the extending direction of the signal line 14 (the opening portion 16a). The reflection axis 62b of the wire grid polarizer 62 is parallel to the rubbing direction of the alignment films 28 and 36 and is formed in a direction forming an angle of 5 degrees in the clockwise direction with respect to the extending direction of the signal line 14 (the opening portion 16a).

The transmission axis 44a of the polarizing plate 44 is perpendicular to the transmission axis 62a of the wire grid polarizer 62, and the transmission axis 45a of the polarizing plate 45 is parallel to the transmission axis 62a of the wire grid polarizer 62. Accordingly, linearly polarized light that is transmitted through the wire grid polarizer 62 is transmitted not through the polarizing plate 44 but through the polarizing plate 45.

<Method of Manufacturing Liquid Crystal Device>

Next, a method of manufacturing the liquid crystal device according to the second embodiment will be described. A difference between the method of manufacturing the liquid crystal device according to the second embodiment and the method according to the first embodiment is that the position of the polarizing plate 44 with respect to the liquid crystal cell 50 is adjusted such that the intensity of the light 57 reaches its minimum in the second process of the second embodiment. However, the other processes of the manufacturing method of the second embodiment are the same as those of the first embodiment. Hereinafter, a description will be followed with reference to FIG. 9.

According to this embodiment, instead of the wire grid polarizer 60 shown in FIG. 9, the wire grid polarizer 62 is disposed on the component substrate 10. In the first and second processes of this embodiment, the intensity of light 57 transmitted through an area of the liquid crystal cell 50 in which the wire grid polarizer 62 is disposed and the polarizing plate 44 is measured. Then, the relative positional relationship of the face of the polarizing plate 44 with respect to the wire grid polarizer 62 (the liquid crystal cell 50) is adjusted such that the intensity of the light 57 reaches its minimum.

At this moment, the intensity of the light 57 reaches its minimum in a position in which the transmission axis 44a of the polarizing plate 44 is perpendicular to the transmission axis 62a (see FIG. 11B) of the wire grid polarizer 62. This position in which the intensity of the light 57 reaches its minimum is a predetermined position in which the transmission axis 44a of the polarizing plate 44 is parallel to the rubbing direction of the alignment film 28.

When the intensity of the light 57 reaches its minimum based on the result of measurement of the intensity of the light 57, the relative positional relationship of the face of the polarizing plate 44 with respect to the liquid crystal cell 50 (the wire grid polarizer 62) is determined, and the polarizing plate 44 is attached to the component substrate 10 of the liquid crystal cell 50.

According to the above-described second embodiment, the following advantages are acquired.

The positional relationship is determined in the second process such that the intensity of the light 57 transmitted through the area of the liquid crystal cell 50 in which the wire grid polarizer 62 is disposed and the polarizing plate 44 reaches its minimum. Accordingly, when the intensity of the light 57 is measured, a measurement device that has high sensitivity for the low light-intensity side can be used appropriately. In addition, the positional relationship is determined in the fourth process such that the intensity of the light 57 transmitted through the area of the liquid crystal cell 50 in which the wire grid polarizer 62 is not disposed, the polarizing plate 44, and the polarizing plate 45 reaches its minimum. Thus, similarly, a measurement device that has high sensitivity for the low light-intensity side can be used appropriately. Accordingly, by using the measurement device that has high sensitivity for the low light-intensity side in both processes for attaching the polarizing plate 44 to the liquid crystal cell 50 and for attaching the polarizing plate 45 to the liquid crystal cell 50, positions of the polarizing plates 44 and 45 relative to the liquid crystal cell 50 can be adjusted more accurately.

Third Embodiment

<Liquid Crystal Device and Method of Manufacturing the Liquid Crystal Device>

Figure 12A:
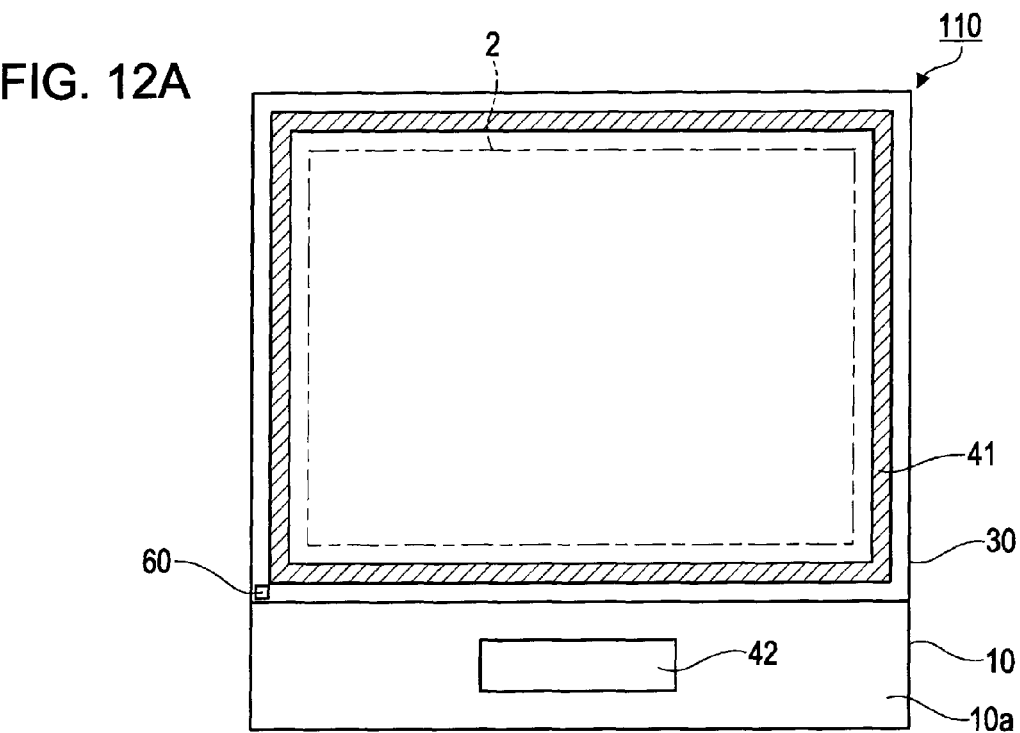
FIGS. 12A and 12B are plan views showing a schematic configuration of a liquid crystal device according to a third embodiment of the invention.
Figure 12B:
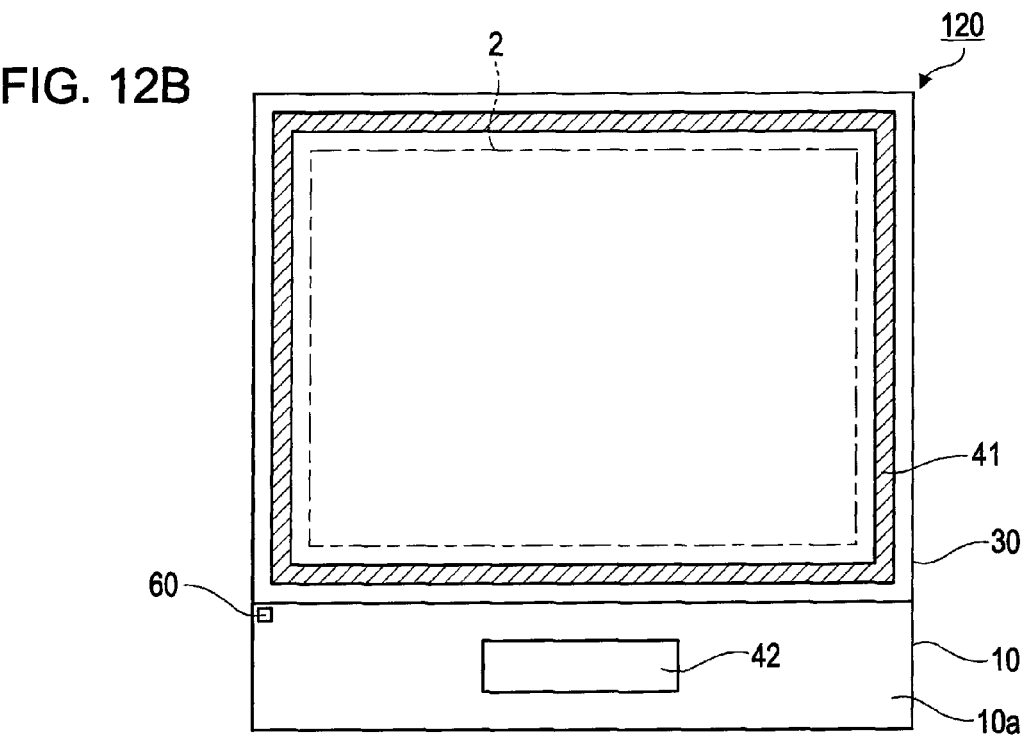

Next, a liquid crystal device according to a third embodiment of the invention and a method of manufacturing the liquid crystal device will be described with reference to the drawings. FIGS. 12A and 12B are plan views showing a schematic configuration of the liquid crystal device according to the third embodiment.

A difference between the liquid crystal device according to the third embodiment and the liquid crystal device according to the first embodiment is that the wire grid polarizer is arranged outside an area surrounded by the sealing member 41 in the liquid crystal device of the third embodiment. However, the other configurations of the liquid crystal device according to the third embodiment are the same as those according to the first embodiment. To each constituent element that is common to the first embodiment, a same reference sign is attached, and a description thereof is omitted here.

In an example of the liquid crystal device 110 shown in FIG. 12A, the wire grid polarizer 60 is arranged outside the area surrounded by the sealing member 41, that is, in a position not overlapping with the liquid crystal layer 40 in the plan view.

Under such a configuration, even when attachment of the polarizing plate 45 to the liquid crystal cell 50 is performed beforehand in the second process, the liquid crystal layer 40 is not interposed between the wire grid polarizer 60 and the polarizing plate 45. Accordingly, when the transmission axis 45a of the polarizing plate 45 is optically adjusted to a predetermined position by using the transmission axis 60a of the wire grid polarizer 60 as a reference, the optical influence of the liquid crystal layer 40 is excluded. As a result, the position of the polarizing plate 45 relative to the liquid crystal cell 50 can be adjusted more accurately.

In an example of the liquid crystal device 120 shown in FIG. 12B, the wire grid polarizer 60 is arranged in the protrusion portion 10a of the component substrate 10. In other words, the wire grid polarizer 60 is arranged in a position not overlapping with the liquid crystal layer 40 and the opposing substrate 30 in the plan view.

Under such a configuration, when attachment of the polarizing plate 45 to the liquid crystal cell 50 is performed beforehand in the second process, the liquid crystal layer 40 and the opposing substrate 30 are not interposed between the wire grid polarizer 60 and the polarizing plate 45. Accordingly, when the transmission axis 45a of the polarizing plate 45 is optically adjusted to a predetermined position by using the transmission axis 60a of the wire grid polarizer 60 as a reference, the optical influence of the liquid crystal layer 40 and the opposing substrate 30 is excluded. As a result, the position of the polarizing plate 45 relative to the liquid crystal cell 50 can be adjusted more accurately.

Fourth Embodiment

<Liquid Crystal Device and Method of Manufacturing the Liquid Crystal Device>

Figure 13A:
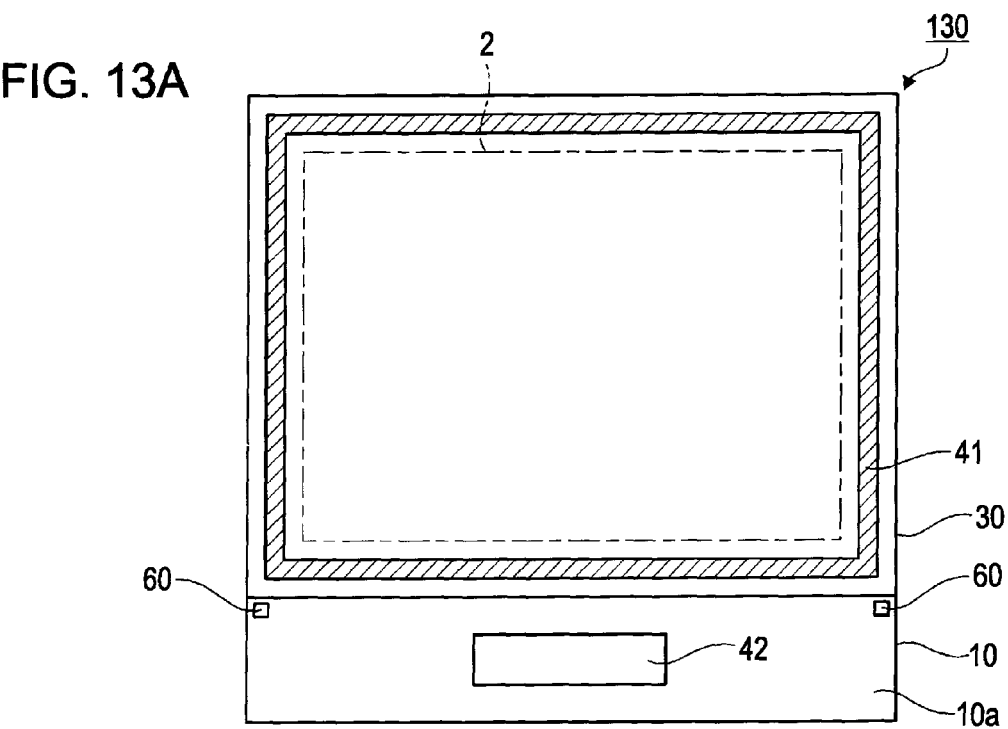
FIGS. 13A and 13B are plan views showing a schematic configuration of the liquid crystal device according to the fourth embodiment.
Figure 13B:
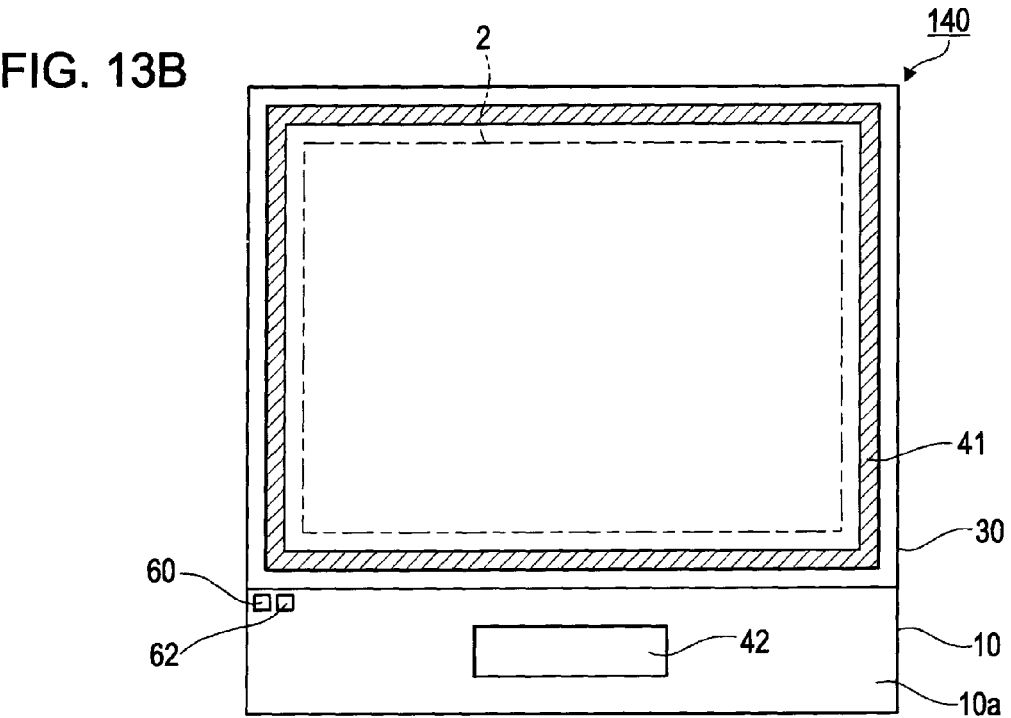

Next, a liquid crystal device according to a fourth embodiment of the invention and a method of manufacturing the liquid crystal device will be described with reference to the drawings. FIGS. 13A and 13B are plan views showing a schematic configuration of the liquid crystal device according to the fourth embodiment.

A difference between the liquid crystal device according to the fourth embodiment and the liquid crystal device according to the first embodiment is that the wire grid polarizers are disposed in two or more spots in the liquid crystal device of the fourth embodiment. However, the other configurations of the liquid crystal device according to the fourth embodiment are the same as those according to the first embodiment. To each constituent element that is common to the first embodiment, a same reference sign is attached, and a description thereof is omitted here.

In an example of a liquid crystal device 130 shown in FIG. 13A, two wire grid polarizers 60 are disposed in first and second positions located in the protrusion portion 10a of the component substrate 10. The first position and the second position, for example, are positions located apart from each other.

In the first and second processes of the process P33 for manufacturing the liquid crystal device 130, the light source 56 and the light receiving part 58 are disposed to correspond with the first position and the second position in which the wire grid polarizers 60 are disposed. Then, the light 57 transmitted through an area of the liquid crystal cell 50 in which the wire grid polarizer 60 located in the first position is disposed and the polarizing plate 44, and the light 57 transmitted through an area of the liquid crystal cell 50 in which the wire grid polarizer 60 located in the second position is disposed and the polarizing plate 44 are received by the light receiving part 58, and the intensity of the light 57 is measured in each case.

Under such a configuration, the transmission axis 44a of the polarizing plate 44 can be optically adjusted to a predetermined position by using the transmission axis 60a of each wire grid polarizer 60 as a reference in two different places of the liquid crystal cell 50 in a parallel manner. Accordingly, the position of the polarizing plate 44 relative to the liquid crystal cell 50 can be adjusted more accurately.

In an example of a liquid crystal device 140 shown in FIG. 13B, a wire grid polarizer 60 is disposed in a first position, and a wire grid polarizer 62 is disposed in a second position. The first position and the second position are different positions located in the protrusion portion 10a of the component substrate 10. The first position and the second position, for example, are positions located close to each other. As described above, the transmission axis 60a of the wire grid polarizer 60 is parallel to the rubbing direction of the alignment films 28 and 36, and the transmission axis 62a of the wire grid polarizer 62 is perpendicular to the rubbing direction of the alignment films 28 and 36.

In the first and second processes of the process P33 for manufacturing the liquid crystal device 140, the light source 56 and the light receiving part 58 are disposed to correspond with the first position in which the wire grid polarizer 60 is disposed and the second position in which the wire grid polarizer 62 is disposed. Then, the light 57 transmitted through an area of the liquid crystal cell 50 in which the wire grid polarizer 60 is disposed and the polarizing plate 44, and the light 57 transmitted through an area of the liquid crystal cell 50 in which the wire grid polarizer 62 is disposed and the polarizing plate 44 are received by the light receiving part 58, and the intensity of the light 57 is measured in each case.

The intensity of the light 57 transmitted through the area of the liquid crystal cell 50 in which the wire grid polarizer 60 is disposed and the polarizing plate 44 reaches its maximum in a position in which the transmission axis 44a of the polarizing plate 44 is parallel to the transmission axis 60a of the wire grid polarizer 60. On the other hand, the intensity of the light 57 transmitted through the area of the liquid crystal cell 50 in which the wire grid polarizer 62 is disposed and the polarizing plate 44 reaches its minimum in a position in which the transmission axis 44a of the polarizing plate 44 is perpendicular to the transmission axis 62a of the wire grid polarizer 62.

Here, when there is a difference between the measured values of the intensities of the light 57, the amount of change in the measured value at the time of performing positional adjustment becomes relatively large compared to the case where the measured value of just one side is taken. Accordingly, when the positional relationship is determined such that the difference of both the measured values reaches its maximum, the position of the polarizing plate 44 relative to the liquid crystal cell 50 can be adjusted more accurately.

In addition, under the configuration of the liquid crystal device 140, the position of the polarizing plate 44 can be adjusted by using any one wire grid polarizer out of the wire grid polarizer 60 and the wire grid polarizer 62 as a reference in accordance with the sensitivity characteristic (a characteristic having high sensitivity for a low light-intensity side or a characteristic having high sensitivity for a high light-intensity side) of a measurement device that is used for measuring the intensity of the light.

In addition, in any one of the liquid crystal devices 130 and 140 according to this embodiment, an equivalent advantage can be acquired when the polarizing plate 45 is attached to the liquid crystal cell 50 first in the second process. In addition, in the liquid crystal devices 130 and 140 according to this embodiment, the wire grid polarizers 60 or 62 may be disposed in three or more spots. Furthermore, in the liquid crystal device 130, instead of the wire grid polarizer 60, the wire grid polarizer 62 may be disposed.

Fifth Embodiment
<Liquid Crystal Device>

Figure 14A:
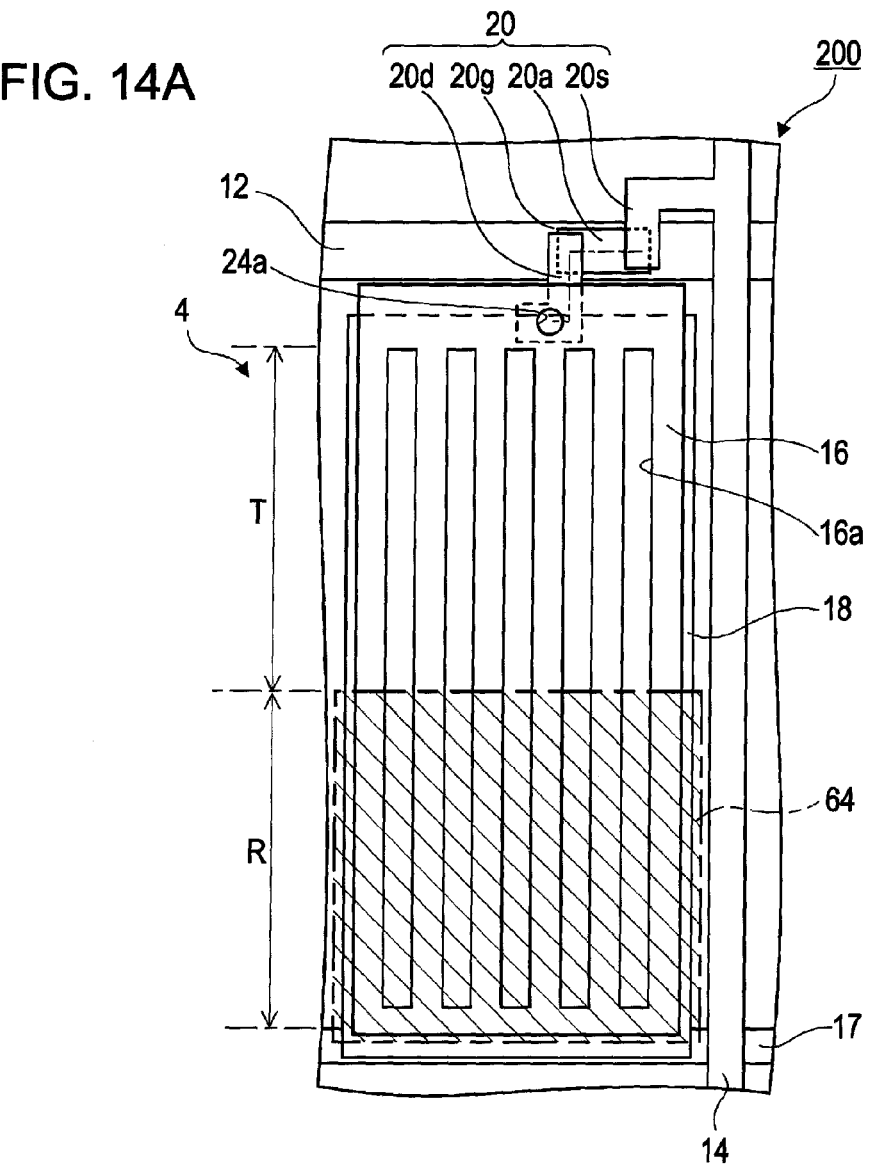
FIGS. 14A and 14B are diagrams showing a schematic configuration of a liquid crystal device according to a fifth embodiment of the invention.
Figure 14B:
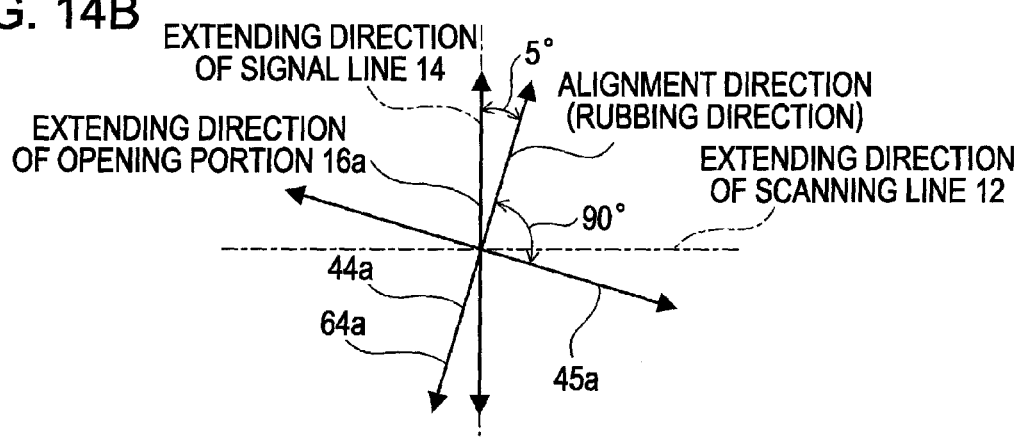

Next, a liquid crystal device according to a fifth embodiment of the invention will be described with reference to the drawings. FIGS. 14A and 14B are diagrams showing a schematic configuration of a liquid crystal device according to the fifth embodiment. In particular, FIG. 14A is a plan view showing the pixel configuration, viewed from the opposing substrate, and FIG. 14B is a diagram showing the condition of the optical design thereof.

The liquid crystal device of the fifth embodiment is different from the liquid crystal device of the first embodiment that it is a semi-transmissive reflection-type having a reflective display area and a wire grid polarizer is disposed in the reflective display area. However, the other configurations of the fifth embodiment are the same as those of the first embodiment. To each constituent element that is common to the first embodiment, a same reference sign is attached, and a description thereof is omitted here.

As shown in FIG. 14A, the liquid crystal device 200 according to the fifth embodiment is a semi-transmissive reflection-type liquid crystal device in which a transmissive display area T and a reflective display area R are included in a pixel 4. The configuration of the liquid crystal device 200 is almost the same as that of the liquid crystal device 100 according to the first embodiment, but is different from the liquid crystal device 100 according to the first embodiment in that it has a wire grid polarizer 64 as a second optical element, instead of the wire grid polarizer 60, disposed in the reflective display area R. In addition, in FIG. 14A, in order to represent the configuration to be easily understood, the wire grid polarizer 64 is represented by being hatched.

The configuration of the wire grid polarizer 64 is the same as that of the wire grid polarizer 60. The wire grid polarizer 64, although not shown in the figure, for example, is formed between the substrate 11 and the common electrode 18. The wire grid polarizer 64 and the common electrode 18 are insulated from each other by an insulating layer or a protective layer or the like that is included in the wire grid polarizer 64.

As shown in FIG. 14B, the transmission axis 64a of the wire grid polarizer 64 is arranged so as to be parallel to the rubbing direction of the alignment films 28 and 36. Accordingly, the transmission axis 44a of the polarizing plate 44 is parallel to the transmission axis 64a of the wire grid polarizer 64, and the transmission axis 45a of the polarizing plate 45 is perpendicular to the transmission axis 64a of the wire grid polarizer 64.

<Method of Manufacturing Liquid Crystal Device>

Next, a method of manufacturing the liquid crystal device according to the fifth embodiment will be described. A difference between the method of manufacturing the liquid crystal device according to the fifth embodiment and the method according to the first embodiment is that the wire grid polarizer 64, instead of the wire grid polarizer 60, is used in the first and second processes as a reference for optical positional adjustment of the polarizing plate in the method according to the fifth embodiment. However, the other processes of the manufacturing method of the fifth embodiment are the same as those of the first embodiment. To each constituent element that is common to the first embodiment, a same reference sign is attached, and a description thereof is omitted here.

In the first and second processes according to this embodiment, although not shown in the figure, the intensity of light 57 is measured when transmitted through an area of the liquid crystal cell 50 in which the wire grid polarizer 64 is disposed, that is, the reflective display area R and the polarizing plate 44. Then, the relative positional relationship of the face of the polarizing plate 44 with the wire grid polarizer 64 (the liquid crystal cell 50) is adjusted such that the intensity of the light 57 reaches its maximum. At this moment, the intensity of the light 57 reaches its maximum in a position in which the transmission axis 44a of the polarizing plate 44 is parallel to the transmission axis 64a (see FIG. 14B) of the wire grid polarizer 64, that is, a predetermined position in which the transmission axis 44a of the polarizing plate 44 is parallel to the rubbing direction of the alignment film 28.

In addition, in the third and fourth processes, the intensity of light 57 is measured when transmitted through an area of the liquid crystal cell 50 in which the wire grid polarizer 64 is not disposed, that is, the transmissive display area T, the polarizing plate 44, and the polarizing plate 45. Then, positional adjustment and attachment of the polarizing plate 45 to the liquid crystal cell 50 is performed.

According to the fifth embodiment, in a semi-transmissive reflection-type liquid crystal device that includes the wire grid polarizer 64 in the reflective display area R like the liquid crystal device 200, the transmission axis 44a of the polarizing plate 44 can be optically adjusted to a predetermined position by using the transmission axis 64a of the wire grid polarizer 64 as the reference. Accordingly, any relative positional deviation between the liquid crystal cell 50 and the polarizing plate 44 can be decreased without disposing the wire grid polarizer for position adjustment.

In addition, the wire grid polarizers 60 and 62 for the positional adjustment according to the above-described embodiments may be included further in the liquid crystal device 200 according to the fifth embodiment. In such a case, the wire grid polarizers 60 and 62 for the positional adjustment can be formed together in a process for forming the wire grid polarizer 64 that is arranged in the reflective display area R.

Sixth Embodiment

<Liquid Crystal Device>

Figure 15A:
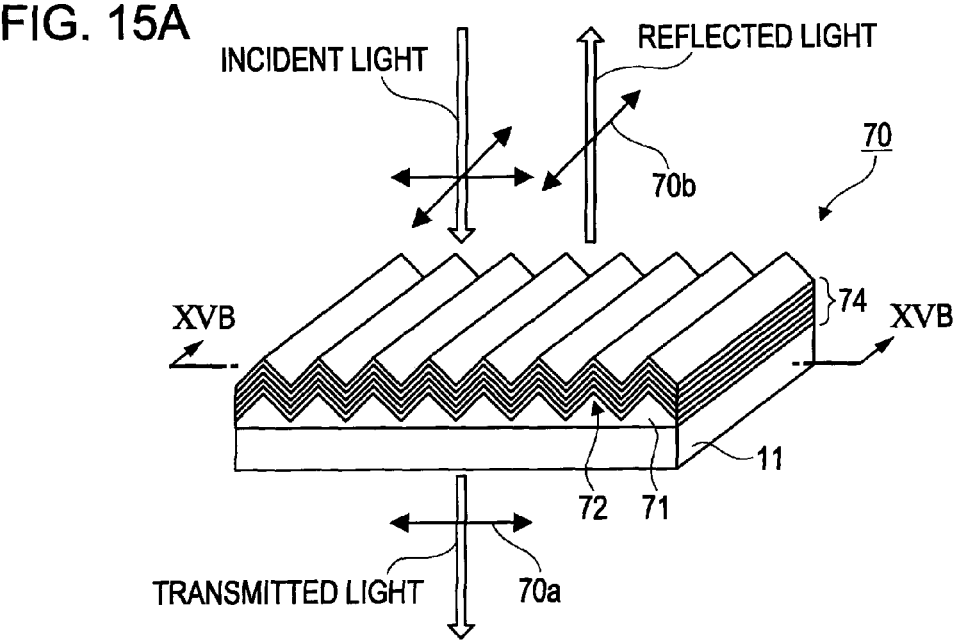
FIGS. 15A to 15C are diagrams showing a schematic configuration of an optical element according to a sixth embodiment of the invention.
Figure 15B:
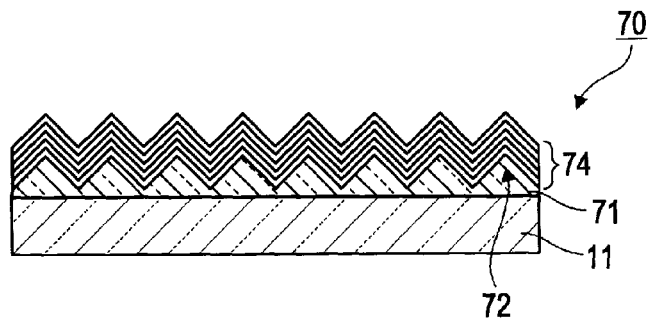
Figure 15C:
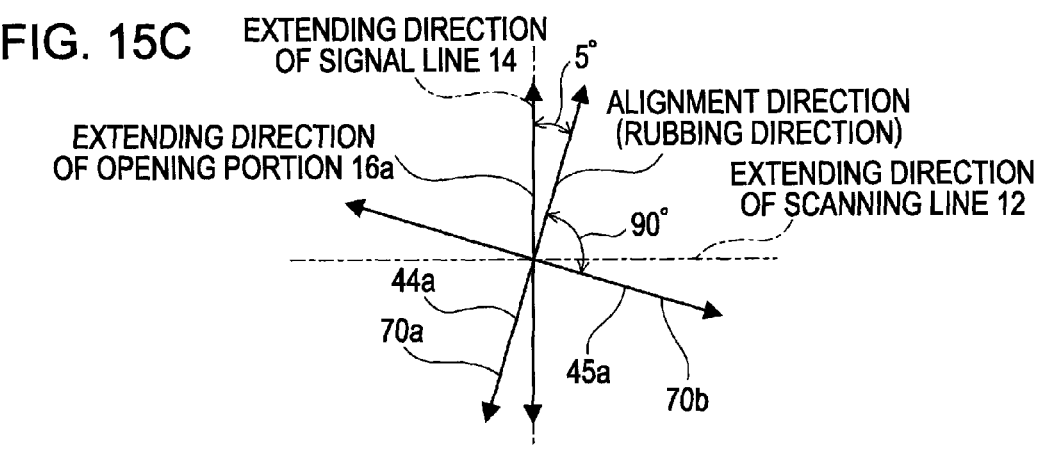

Next, a liquid crystal device according to a sixth embodiment of the invention will be described with reference to the drawings. FIGS. 15A to 15C are diagrams showing a schematic configuration of an optical element according to the sixth embodiment. In particular, FIG. 15A is a perspective view of the optical element, and FIG. 15B is a cross-sectional view taken along line XVB-XVB shown in FIG. 15A. FIG. 15C is a diagram showing the condition of optical design.

The liquid crystal device according to the sixth embodiment is different from the above-described embodiments in that a dielectric interference film prism is included instead of the wire grid polarizer. However, the other configurations of the sixth embodiment are the same as those of the above-described embodiments. To each constituent element that is common to the first embodiment, a same reference sign is attached, and a description thereof is omitted here.

The liquid crystal device according to the sixth embodiment, as shown in FIGS. 15A and 15B, includes an optical element that has a prism array 71 and a dielectric interference film 74 that is formed on the prism array 71 as a first optical element. Here, this optical element is referred to as a dielectric interference film prism 70.

The prism array 71 is formed on the substrate 11 and has a plurality of convex lines 72 that have a triangle pole shape (prism shape) with two slope faces. In other words, by periodically forming the convex lines 72 continuously, the prism array 71 having a cross section of a triangular wave shape is configured. The prism array 71, for example, is formed of transparent resin having a thermosetting property or a light curing property such as an acrylic resin. The height of the convex line 72 of the prism array 71, for example, is about 0.5 µm to 3 µm. In addition, the pitch between adjacent convex lines 72, for example, is about 1 µm to 6 µm.

The dielectric interference film 74 is formed on the prism array 71 so as to have a surface on which the slope face of the triangle pole shape (prism shape) due to the plurality of the convex lines 72 is reflected. The dielectric interference film 74 is a so-called three-dimensional photonic crystal layer in which a plurality of dielectric films formed of two types of materials that have different refractive indices are laminated alternately. The dielectric interference film 74, for example, is formed by laminating seven layers of titanium dioxide ($TiO_2$) films and silicon dioxide ($SiO_2$) films in an alternating manner. The material of the dielectric film may be tantalum pentoxide ($Ta_2O_5$) or silicon (Si). The film thickness of one layer of the dielectric film that configures the dielectric interference film 74, for example, is about 10 nm to 100 nm. In addition, the total film thickness of the dielectric interference film 74, for example, is about 300 nm to 1 µm.

The dielectric interference film prism 70 has a function for dividing incident light into reflected light and transmitted light that have different polarized states. As shown in FIG. 15A, the dielectric interference film prism 70 reflects a polarized component of the incident light that is parallel to the extending direction of the convex line 72 and transmits a polarized component of the incident light that is perpendicular to the extending direction of the convex line 72. In other words, the dielectric interference film prism 70 has the transmission axis 70a and a reflection axis 70b as optical axes. The transmission axis 70a is perpendicular to the extending direction of the convex line 72, and the reflection axis 70b is parallel to the extending direction of the convex line 72.

As shown in FIG. 15C, the transmission axis 70a of the dielectric interference film prism 70 is arranged to be parallel to the rubbing direction of the alignment films 28 and 36. Accordingly, the transmission axis 70a of the dielectric interference film prism 70 extends in a direction forming an angle of 5 degrees in the clockwise direction with respect to the extending direction of the signal line 14 (opening portion 16a). The reflection axis 70b of the dielectric interference film prism 70 extends in a direction perpendicular to the rubbing direction of the alignment films 28 and 36 and in a direction forming an angle of 95 degrees in the clockwise direction with respect to the extending direction of the signal line 14 (the opening portion 16a). Accordingly, the transmission axis 44a of the polarizing plate 44 is parallel to the transmission axis 70a of the dielectric interference film prism 70, and the transmission axis 45a of the polarizing plate 45 is perpendicular to the transmission axis 70a of the dielectric interference film prism 70.

The lamination pitch of the dielectric films that constitute the dielectric interference film 74 and the pitch of the convex lines 72 are appropriately adjusted in accordance with the characteristics required for the dielectric interference film prism 70. The transmittance (reflectivity) of the dielectric interference film 74 can be controlled based on the number of laminated dielectric films that constitute the dielectric interference film 74. In other words, by decreasing the number of laminated dielectric films, the transmittance of linearly polarized light that is parallel to the reflection axis 70b (the extending direction of the convex line 72) is increased, and whereby the reflectivity can be decreased. When a predetermined number or more of the dielectric films are laminated, most of the linearly polarized light that is parallel to the reflection axis 70b is reflected.

In the dielectric interference film prism 70 according to this embodiment, by adjusting the dielectric interference film 74, for example, is set so as to reflect about 70% of the linearly polarized light of the incident light parallel to the reflection axis 70b and transmit the remaining about 30% of the linearly polarized light. The surface of the dielectric interference film 74 may be covered with a resin layer so as to be flattened.

In addition, the method of manufacturing the liquid crystal device according to the above-described embodiment can be applied even to a case where the liquid crystal device according to the above-described embodiment includes the dielectric interference film prism 70 as the first optical element instead of the wire grid polarizers 60 and 62, or includes a dielectric interference film prism as the second optical element in the reflective display area R instead of the wire grid polarizer 64, and same advantages as those of the above-described embodiments can be acquired.

When the dielectric interference film prism is disposed instead of the wire grid polarizer 62, the transmission axis of the dielectric interference film prism is arranged so as to be perpendicular to the rubbing direction of the alignment films 28 and 36. Accordingly, the transmission axis of the dielectric interference film prism is perpendicular to the transmission axis 44a of the polarizing plate 44 and is parallel to the transmission axis 45a of the polarizing plate 45.

<Electronic Apparatus>

The liquid crystal device according to the above-described embodiments may be used by being mounted in an electronic apparatus such as a cellular phone. The electronic apparatus may be a mobile computer, a digital camera, a digital video camera, an audio apparatus, a liquid crystal projector, or the like. By including the liquid crystal device according to the above-described embodiments in a display unit, an electronic apparatus having a superior display quality can be provided.

As above, the embodiments of the invention have been described. However, various changes in forms may be made in the above-described embodiments within the scope and not departing from the gist of the invention. As modified examples, for example, the followings can be considered.

MODIFIED EXAMPLE 1

Figure 16:
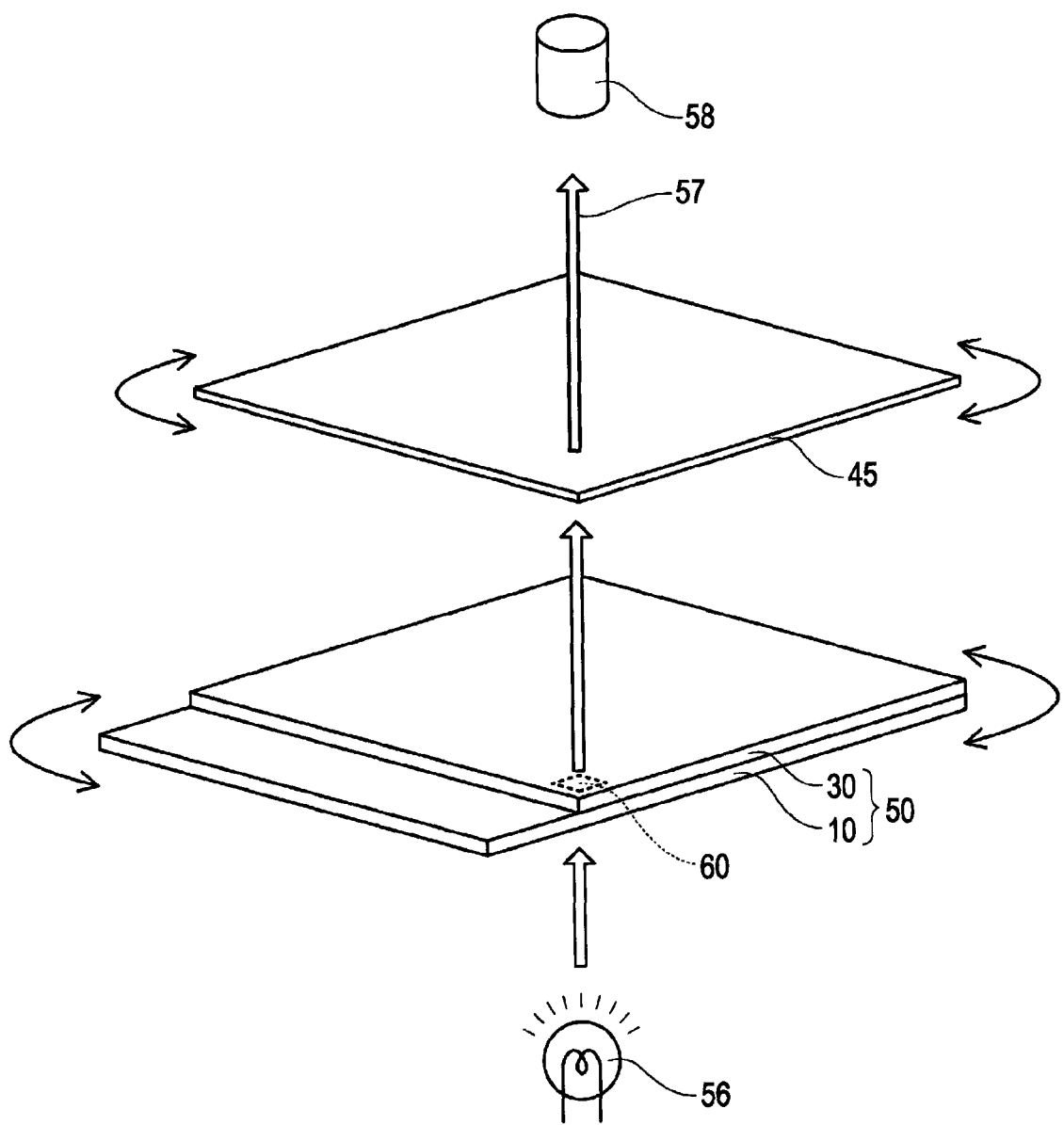
FIG. 16 is a diagram showing a method of manufacturing a liquid crystal device according to Modified Example 1.

The liquid crystal device according to the first embodiment has the configuration in which the wire grid polarizer 60 is disposed on the component substrate 10. However, the invention is not limited thereto. Thus, the wire grid polarizer 60 may be disposed on the opposing substrate 30. FIG. 16 is a diagram showing a method of manufacturing a liquid crystal device according to Modified Example 1.

As shown in FIG. 16, according to the liquid crystal device according to Modified Example 1, the wire grid polarizer 60 is disposed on the opposing substrate 30. The opposing substrate 30 has more space around the display area 2 (see FIG. 1) than the component substrate 10 in which the grid polarizer 60 can be arranged. Accordingly, by arranging the wire grid polarizer 60 on the opposing substrate 30, limitation on the places in which the wire grid polarizer 60 can be disposed is alleviated.

In the liquid crystal device according to Modified Example 1, it is preferable that attachment of the polarizing plate 45 to the liquid crystal cell 50 is performed first in the process P33. In the first process of the process P33, the polarizing plate 45 is arranged on the outer side of the opposing substrate 30 of the liquid crystal cell 50. Then, the intensity of light 57 transmitted through an area of the liquid crystal cell 50 in which the wire grid polarizer 60 is disposed and the polarizing plate 45 is measured. The relative positional relationship of the face of the polarizing plate 45 with the wire grid polarizer 60 (the liquid crystal cell 50) is determined such that, for example, the intensity of the light 57 reaches its minimum. Then, the polarizing plate 45 is attached to the opposing substrate 30 of the liquid crystal cell 50.

According to such a method, the polarizing plate 45 is arranged on the outer side of the opposing substrate 30 on which the wire grid polarizer 60 is disposed, and accordingly, the liquid crystal layer 40 and the component substrate 10 are not interposed between the wire grid polarizer 60 and the polarizing plate 45. Accordingly, when the transmission axis 45*a* of the polarizing plate 45 is optically adjusted to a predetermined position by using the transmission axis 60*a* of the wire grid polarizer 60 as the reference, the optical influence of the liquid crystal layer 40 and the component substrate 10 is excluded. In addition, a configuration in which the wire grid polarizer 62 or the dielectric interference film prism 70 is disposed instead of the wire grid polarizer 60 may be used.

MODIFIED EXAMPLE 2

The liquid crystal device according to the above-described embodiments has the configuration in which the wire grid polarizer or the dielectric interference film prism is included as the first optical element or the second optical element. However, the invention is not limited thereto. As the first optical element or the second optical element, a different optical element may be used as long as it has a polarization separation function.

MODIFIED EXAMPLE 3

Figure 17A:
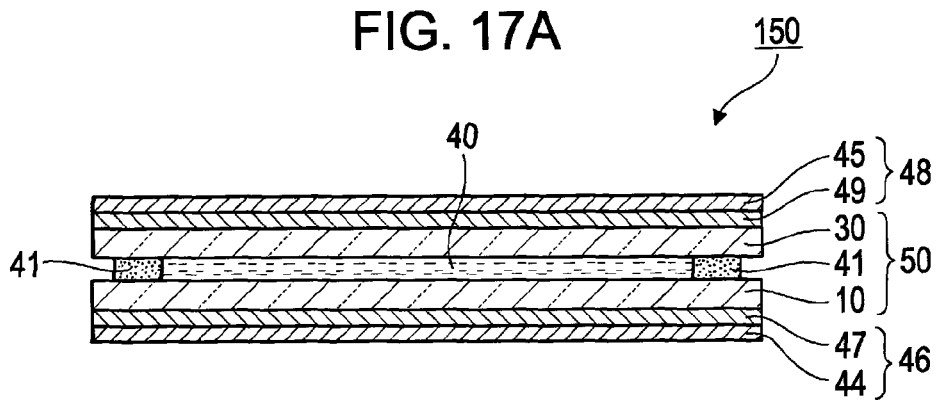
FIGS. 17A and 17B are diagrams showing a liquid crystal device and a method of manufacturing the liquid crystal device according to Modified Example 3.
Figure 17B:
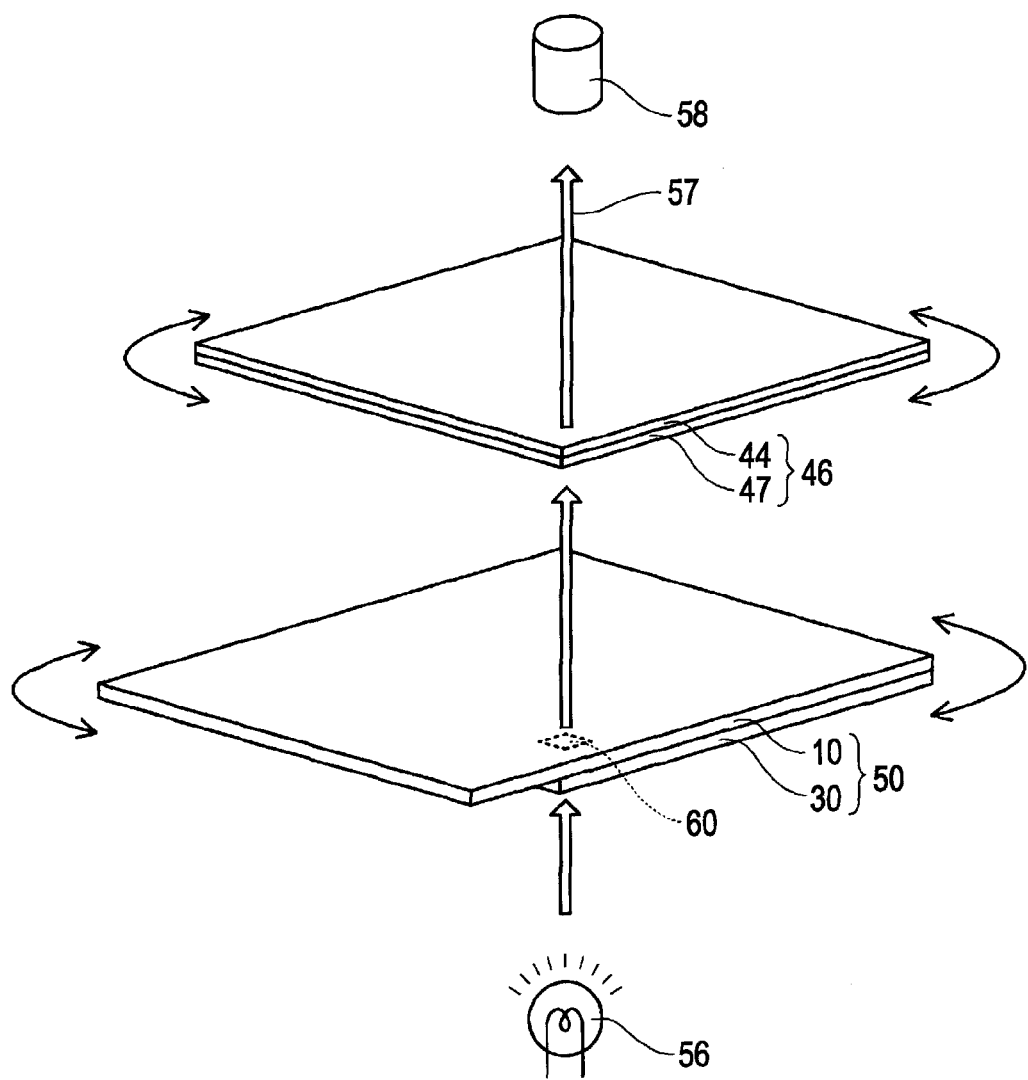

In the above-described embodiments, a configuration in which the polarizer constituted by the polarizing plates is attached to the liquid crystal cell is used. However, the invention is not limited thereto. The method of manufacturing the liquid crystal device according to the above-described embodiments may be applied to a configuration in which the polarizer includes an optical compensation plate in addition to the polarizing plate. FIGS. 17A and 17B are diagrams showing a liquid crystal device and a method of manufacturing the liquid crystal device according to Modified Example 3. In particular, FIG. 17A is a cross-sectional view showing a schematic configuration of the liquid crystal device according to Modified Example 3, and FIG. 17B is a diagram showing the method of manufacturing the liquid crystal device.

As shown in FIG. 17A, the liquid crystal device 150 according to Modified Example 3 includes a liquid crystal cell 50 and a polarizer 46 and a polarizer 48 that are arranged on both outer sides of the liquid crystal cell 50. The polarizer 46 includes a polarizing plate 44 and an optical compensation plate 47 that is laminated on the polarizing plate 44. The polarizer 46 is arranged such that the optical compensation plate 47 opposes the side of the component substrate 10. The polarizer 48 includes a polarizing plate 45 and an optical compensation plate 49 that is laminated on the polarizing plate 45. The polarizer 48 is arranged such that the optical compensation plate 49 opposes the side of the opposing substrate 30. The optical compensation plates 47 and 49 are used for achieving enlargement of the viewing angle, compensation for coloring of the background color, and the like in display of the liquid crystal device by performing an optical compensation, for example, of the liquid crystal cell 50 or the polarizing plates 44 and 45.

Here, in the process P33, for example, attachment of the polarizer 46 to the liquid crystal cell 50 is performed first, and thereafter, attachment of the polarizer 48 is performed. As shown in FIG. 17B, in the first and second processes, the polarizer 46 is arranged on the outer side of the component substrate 10 of the liquid crystal cell 50 such that the optical compensation plate 47 opposes the side of the component substrate 10. Then, the relative positional relationship of the face of the polarizer 46 with the wire grid polarizer 60 (the liquid crystal cell 50) is determined such that the intensity of light 57 transmitted through an area of the liquid crystal cell 50 in which the wire grid polarizer 60 is disposed and the polarizer 46 reaches its maximum, and the polarizer 46 is attached to the component substrate 10 of the liquid crystal cell 50.

Next, although not shown in the figure, in the third and fourth processes, the polarizer 48 is arranged to the outer side of the opposing substrate 30 of the liquid crystal cell 50 such that the optical compensation plate 49 opposes the side of the opposing substrate 30. Then, the relative positional relationship of the face of the polarizer 48 with the liquid crystal cell 50 is determined such that the intensity of light 57 transmitted through an area of the liquid crystal cell 50 in which the wire grid polarizer 60 is not disposed and the polarizer 48 reaches maximum, and the polarizer 48 is attached to the opposing substrate 30 of the liquid crystal cell 50.

The polarizer 46 and 48 may have a configuration in which two or more layers of the optical compensation plates are laminated on the polarizing plates 44 and 45. In addition, any one between the polarizer 46 and 48 may have a configuration in which the optical compensation plate is not included.

MODIFIED EXAMPLE 4

In the above-described embodiments, the liquid crystal device is a liquid crystal device of an FFS mode. However, the invention is not limited thereto. The liquid crystal device may be a liquid crystal device of an IPS (in-plane switching) mode in which the alignment of liquid crystal molecules is controlled in accordance with a horizontal electric field formed in a direction parallel to the component substrate, similar to the FFS mode. In addition, the liquid crystal device may be a liquid crystal device of a TN (twisted nematic) mode, a VA (vertical alignment) mode, an ECB (electrically controlled birefringence) mode, or the like in which alignment of the liquid crystal molecules is controlled in accordance with a vertical electric field that is generated between the component substrate and the opposing substrate. The liquid crystal device according to the above-described embodiments and the method of manufacturing the liquid crystal device may also be applied to the above-described liquid crystal devices.

The entire disclosure of Japanese Patent application No. 2008-261377, field Oct. 8, 2008 is expressly incorporated by reference herein.

What is claimed is:

1. A liquid crystal device, comprising:
a first substrate and a second substrate facing each other;
a liquid crystal layer between the first substrate and the second substrate;
a pair of polarizers, wherein the first substrate and the second substrate are disposed between the pair of polarizers; and
a first optical element having a polarization separation function, wherein
the first optical element is disposed directly in the first substrate,
the first optical element is arranged outside a display area that has a display function, and
the first optical element has a first transmission axis parallel or perpendicular to a second transmission axis of at least one polarizer of the pair of polarizers.

2. The liquid crystal device according to claim 1, wherein the first transmission axis of the first optical element is parallel to an aligning direction of the liquid crystal layer on the first substrate, and
wherein the second transmission axis of the at least one polarizer included in the pair of polarizers is parallel to the first transmission axis of the first optical element.

3. The liquid crystal device according to claim 1, wherein the first transmission axis of the first optical element is perpendicular to an aligning direction of the liquid crystal layer on the first substrate, and
wherein the second transmission axis of the at least one polarizer included in the pair of polarizers is perpendicular to the first transmission axis of the first optical element.

4. The liquid crystal device according to claim 1, wherein the first optical element is disposed in two or more spots of the first substrate.

5. The liquid crystal device according to claim 4, wherein the first optical element disposed in the two or more spots includes:
an optical element that is disposed in a first spot and has a transmission axis parallel to an aligning direction of the liquid crystal layer on the first substrate; and
an optical element that is disposed in a second spot different from the first spot and has a transmission axis perpendicular to the aligning direction of the liquid crystal layer on the first substrate.

6. The liquid crystal device according to claim 1, wherein the first optical element is arranged in a position not overlapping with the liquid crystal layer in the plan view.

7. The liquid crystal device according to claim 6,
wherein the first substrate has a protruding portion that does not overlap with the second substrate in the plan view, and
wherein the first optical element is disposed in the protruding portion.

8. The liquid crystal device according to claim 1, wherein the first optical element includes a metal reflection film arranged in a stripe shape.

9. The liquid crystal device according to claim 1, wherein the first optical element includes a prism array and a dielectric interference film that is formed on the prism array.

10. The liquid crystal device according to claim 1, further comprising:
a reflective display area that is arranged in the display area; and
a second optical element that is disposed in the reflective display area of the first substrate and has a polarization separation function.

11. The liquid crystal device according to claim 1, wherein at least one polarizer included in the pair of polarizers includes a polarizing plate and an optical compensation plate that is laminated on the polarizing plate.

12. The liquid crystal device according to claim 1, wherein the first optical element is disposed between the pair of polarizers in a direction normal to the first substrate.

13. The liquid crystal device according to claim 12, further comprising:
a sealing member that seals the liquid crystal layer between the first and second substrates,
wherein the first optical element is disposed outside an area surrounded by the sealing member.

* * * * *